(12) United States Patent
Bardgett

(10) Patent No.: US 9,237,125 B1
(45) Date of Patent: Jan. 12, 2016

(54) SYSTEM AND ASSOCIATED METHODS FOR SECURE COMMUNICATIONS

(71) Applicant: Applied Knight, LLC, Oviedo, FL (US)

(72) Inventor: Jim Bardgett, Oviedo, FL (US)

( * ) Notice: Subject to any disclaimer, the term of this patent is extended or adjusted under 35 U.S.C. 154(b) by 0 days.

(21) Appl. No.: 14/269,849

(22) Filed: May 5, 2014

Related U.S. Application Data

(60) Provisional application No. 61/819,602, filed on May 5, 2013.

(51) Int. Cl.
*H04L 29/06* (2006.01)
(52) U.S. Cl.
CPC .................................... *H04L 63/02* (2013.01)
(58) Field of Classification Search
USPC ...................................................... 726/11–15
See application file for complete search history.

(56) References Cited

U.S. PATENT DOCUMENTS 6,240,530 B1 * 5/2001 Togawa ....................... 714/38.13
7,725,934 B2 * 5/2010 Kumar et al. ................... 726/22

* cited by examiner

*Primary Examiner* — Ghazal Shehni

(57) ABSTRACT

A network security device and associated methods which protects a user's computer from the direct effects of software sent from a server by converting the data to a non-volatile information stream using two or more firewall isolation stages. The multistage functionality completely decouples the information communicated from the bulk of data sent from the server by converting the data into non-volatile information and eliminates risk from the even most aggressive adaptive malware by using an intermediate protocol translation between two of the stages contained in the decoupling firewall.

19 Claims, 24 Drawing Sheets

```
Steady State Pseudo Code for Client Computer {
  while browser window is open
    receive non-volatile data by channel across driver from transmit on Landing Machine {
      validation of received protocol
      volatility scan of non-volatile data
      handoff of non-volatile data to application for display
    }
    receive non-volatile data from driver and assemble into display, convert to user level comprehendible display and information
    present display information in browser to user in the browser content area
    while mouse over active browser window {
      accept control input, namely {
        keystroke input from keyboard
        location input from mouse
        button input from mouse
      }
      package and send control input via channel across driver to receive on Landing Machine
    }
  subscribe to channel from Landing Machine
  control of application on client
  control of subscription of Landing Machine from Lead Machine
  control of rate limiting and similar security features on Client Computer
  control of rate limiting and similar security features on Landing Machine
}
```

2520

```
Steady State Pseudo Code for Landing Machine {
  while software is running {
    receive control input by channel across driver from transmit on Client Computer {
      validation of received protocol
      reassembly of control data and validation
      conversion of control data
      transmit control data to channel across driver to receive on Lead Machine
    }
    receive non-volatile data from a second driver from transmit on Lead Machine {
      validation of received protocol
      volatility scan of non-volatile data
    }
    reassembly of non-volatile data and validation
    conversion of non-volatile data
    content conversion
    protocol translation
    transmit non-volatile data to third driver to receive on Client Computer
    command functions {
      subscribe to channel from Lead Machine
      control of application on Landing Machine
      control of subscription of Landing Machine from Lead Machine
      control of rate limiting and similar security features on Landing Machine
    }
  }
}
```

Fig. 22

```
2610
Steady State Pseudo Code for Lead Machine {
    while browser window is open
        receive volatile data by channel across driver from Internet Server as a typical client browser
        act upon volatile data to display information in the browser on Lead Machine as a typical client browser
        conversion of volatile data to non-volatile data {
            capture display area of browser at frequent intervals for transmission to client computer
            convert the display area to mjpeg, png or other appropriate non-volatile data
        }
        validate non-volatile data as non-volatile
        send non-volatile data by channel across driver to receive on Lead Machine
        receive control data from another driver and separate streams of control data into {
            keystroke input from keyboard
            location input from mouse
            button input from mouse
        }
        direct control streams to appropriate method such as bus, driver or browser plugin
        react to control data in browser window as if the control data originates locally
        content conversion
        protocol translation
    command functions {
        control of rate limiting and similar security features on Lead Machine
    }
}
```

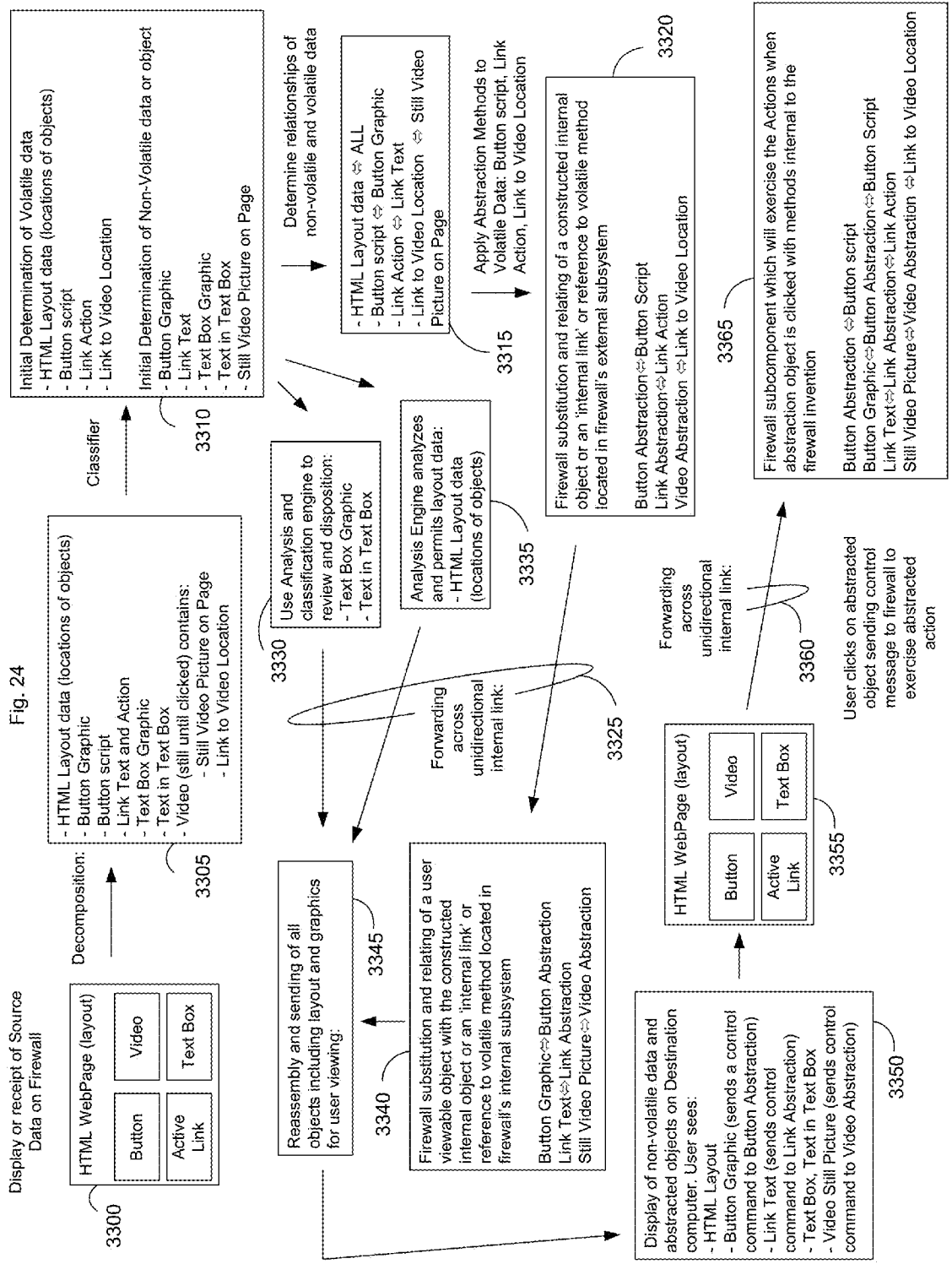

SYSTEM AND ASSOCIATED METHODS FOR SECURE COMMUNICATIONS

CROSS-REFERENCE TO RELATED APPLICATIONS

This application claims priority to U.S. Provisional Patent Application No. 61/819,602 filed on May 5, 2013 and entitled "A Firewall for Isolating Information from volatile code". This application is incorporated by reference herein in its entirety.

FIELD OF THE INVENTION

The invention relates to firewalls, network security, computer security, virtual computing, networks, secure communications, anti-virus, anti-malware, anti-rootkit and data exchange.

BACKGROUND OF THE INVENTION

Computer networks provide a communications path between network attached computers which exchange data via communications protocols. The communications model for the Internet is based on Internet Protocol (IP) which facilitates end to end communications.

Generally, in order for computers to communicate over networks, an IP address, subnet and method of getting an IP packet to a destination is required, the method is provided by routing protocols on routers between IP communications endpoints. All devices, namely switches, routers and firewalls between two hosts engaged in communications pass the IP traffic to enable the communication, in some cases, firewalls will also prohibit that communication.

Firewalls typically perform two main types of functions when permitting the end to end traffic, the first obfuscates the IP address of a device using network address translation and the second is a proxy function to terminate a protocol at a higher layer, for example above the end to end IP layer communications. Existing application and proxy firewalls keep a continuous path and only change IP addresses or TCP ports.

While other security functions exist such as determining if IP or higher protocol level traffic should be denied, or the method of how to impose the denial, those functions are not pertinent, other than to state that the traffic is blocked in some manner unless a method around the blocking is discovered legitimately or by a nefarious act. It is sufficient to say that firewalls in general, when passing permitted traffic, harmful or not, pass the traffic directly between two IP hosts and that no modifications to the data contained in the end to end IP packets are made, including upon detailed packet inspection, except to modify packet headers without modifying any application layer data within the packet.

As such, existing firewalls which permit an IP packet to pass from sender to receiver do so without obstruction or modification of the IP packet's data. If the data within the packet has an adverse effect on the receiving system, it can cause loss of the use of the recipient's system, expose the computer's owner to loss of data, intellectual property, personal details and it may permit an open channel for additional unwelcome activity. While numerous plans exist to abate this, each has to be performing at perfection, such as systems which are properly patched and the attacker has to know of no method around the security imposed, published or unpublished and the attacker must be incapable of penetrating the system, an instance which has shown to be challenging at a minimum and is not solvable with current methods. The many exposures of credit card data and other data theft show just how hard it is for the current systems to be effective.

Data, such as a program on the sender's computer can be reproduced exactly on the user's computer, as this occurs in most, if not all computer security breaches. An alternative approach would be to not permit direct communications between the user's computer which stores such data and details, and the communications partner.

The current problem which is difficult to solve is that volatile data which can alter the state of a recipient computer system can change the state of the computer system in ways which are unintended and can compromise the security of the system. Existing methods to prevent volatile data transmission between computers include virus scanning, packet inspection, and intrusion protection systems based on heuristic, signature or other approaches which have limited success. The current firewall systems which provide security are in the path of the communications and can fail to block volatile communications in all cases, in part because the end to end passing of data between two hosts requires a paradigm shift. The solution is to prevent volatile data from interacting with a computer and prior attempts have not yielded a solution.

For clarification of existing method shortcomings, FIG. 1, shows a typical end to end communications path between a communication partner 110 functioning as a client computer and communications partner 115 functioning as a Web Server which is using the TCP/IP protocol suite, consisting of TCP and IP in this case. As part of the communications setup between 110 and 115, a TCP three-way handshake will occur between 110 and 115 and direct communications are established. The end to end communication path, in reality, consists of switches, routers, firewalls and other network and security devices. The end-to-end path is being used to transport precise data between the two applications, an HTTP server on 115 and a Browser on 110. This is the current method used for a typical client computer to connect to a remote web server, for example, on the Internet. The format and content of the precise data communicated over the direct connection generally does not change, and is at least in part identical, when compared on both communications partners 110 and 115.

This first example, which is the state of the current method used on the Internet, shows a client which is in the process of requesting and receiving webpage data. The HTTP protocol as defined in RFC 2068 carries the intended data from the 115 server to the 110 client, which is, in this case, a file such as a cookie or the client side textual tag with the characters '<script>' or a command embedded in an HTML document. The cookie, or '<script>' tag used to define a client-side script, is transmitted from the server 115 to the client 110 and it is received at the client 110. The '<script>' tag, for example, can be viewed on 110 in the browser's 'page source' and it is the identical text '<script>' which was sent from the Web Server 115 which is verifiable with packet capture techniques and analysis of the storage or software on both 115 and 110. The active functionality associated with this '<script>' command can cause an action to occur on 110.

It should be recognized that the data being sent from server to client can originate from storage such as a hard drive or volatile media like random access memory (RAM). Additionally, the data may be unique to the individual communication and calculated via algorithm or uniquely and dynamically constructed for the client, such as in the case of a tracking cookie. In the example shown in FIG. 1, an HTML file on the server is the source of the data and an analysis of the Server 115 would yield a file with the exact data or an algorithm to create the data found on Client 110. Based on the HTML example, the '<script>' tag in ASCII text format on 115 becomes an identical '<script>' tag in ASCII text format on Client 110. Additional concern here is that the tag has the ability to cause an action to occur 110 by activation of this HTML tag. The transference of this data '<script>' from the server to the client is verifiable using existing packet analysis tools or data carving tools on storage or volatile media on each communications partner 115 and 110 and by performing a cryptographic hash on the data yielding the same results. This reproducibility is the intention of IP end to end communications and other protocols support the reliability of the reproduction.

Similarly, a JPEG file on 115 called 'malware.jpg' could be transmitted from the Server 115, to the Browser on Client 110, as unaltered or only slightly modified data, such as a filename change on the Client 110 storage media. It is possible that a file transmitted to the Client 110 from the Server 115 has the exact same cryptographic hash, statistically ensuring an exact copy. If the hash does not match for the entire file it can match for significant portions of the corresponding files, on each communications partner, when isolated from the storage using data carving techniques. Data carving is the technique of using a hex editor and assembling the sections of a file or file fragment such that it can be in a form for analysis or comparison to a corresponding file on another computer. Cryptographic hashing algorithms typically in use at the writing of this document are MD5, SHA-1 or SHA-256.

This method of end to end communications 195 occurs in countless ways on communications devices 110, 115 of many different kinds and running many different software applications over protocols such as TCP, UDP and IP.

A practical example of a direct connection between two communication partners is the web server and client computer shown in FIG. 2. The firewalls shown may alter the IP addresses of the devices and even modify the protocols such as encapsulation, but application data is intentionally passed with little or no modification between devices as previously described.

In operation, the user types a URL into the browser located on the client computer 210 and activates the instruction to the Browser by depressing the 'enter key' on the computer keyboard which issues a request to the web server 215 for the HTML content of a web page. ATCP three-way handshake then establishes a direct connection between the client computer 210 and the web server 215. The properly formatted request is then sent in packets through firewalls 230, 235 and the Internet 250 to the IP address of the web server 215, by means of the server's IP address, some change of IP addresses may occur due to network address translation or translation of the TCP port. Next, the web server 215 sends an HTML file and associated files containing text, scripts, links and graphics files back through the firewalls 230, 235 and Internet 250 to the client computer 210 by means of the client's IP address. Some of the content sent by the web server 215 to the client computer 210 will be saved on the hard drive or located in memory on the client computer 210, some of the content sent by the web server 215 to the client computer's browser will be displayed as a web page with graphics, text, sound or video, and some of the content sent by the web server 215 to the client computer 210 will be acted upon such as commands or active content or the running of HTML scripts. In the exemplary embodiment, throughout the communications the connections 260, 265, 270, 275 between devices 210, 230, 250, 235, 215 have represented network hardware which supports the communications such as links, switches, routers.

In this process, data stored on the web server, and properly referenced in the HTML language, such as text, a graphic (e.g. JPEG) or a video (e.g. MPEG), is presented and directly passed, in original or slightly modified format, to the client computer. For example, a file known as 'infectme.jpg' which is on the web server and listed properly in the web page is displayed on the computer screen. That same file can be found on the client computer, perhaps with a different name, but with highly similar content. The corresponding file or data on each computer may have an exact cryptographic hash, or some significant portion of the file or data, when 'data carved', may have the exact cryptographic hash such as obtained with the MD-5 or SHA-1 algorithm.

In some cases firewalls based on proxy methods will terminate the communications process for TCP. In FIG. 3, a proxy 335 is shown which has a communications path 365 with the communications partner 315 which could fill the role of web server. The other communications partner 310, could be filling the role of client computer with a Browser. In this case or type of communications, the communications is still the same regarding the transfer of data between communications partners 315 and 310. This is evident that files can be transferred between the devices and that there is a clear communications path over IP between the two endpoints. An 'infectme.jpg' could still travel unabated between the communications partners 315, 310 because of an existing end to end communication path 395 with a single protocol set such as TCP/IP across paths 360, 365.

What is needed is a way to impede direct transfer between sender and receiver while still communicating the information. However in view of the art considered as a whole at the time this present invention was made, it was not obvious to those of ordinary skill how the art could be advanced.

While certain aspects of the conventional technologies have been discussed to facilitate disclosure of the invention, Applicants in no way disclaim these technical aspects, and it is contemplated that the claimed invention may encompass one or more of the conventional technical aspects contained herein.

The present invention may address one or more of the problems and deficiencies of the prior art discussed above. However, it is contemplated that the invention may prove useful in addressing other problems and deficiencies in a number of technical areas. Therefore the claimed invention should not be construed as limited to addressing any of the particular problems or deficiencies discussed herein.

In this specification, where a document, act or item of knowledge is referred to or discussed, this reference or discussion is not an admission that the document, act or item of knowledge of any combination thereof was at the priority date, publically available, known to the public, part of common general knowledge, or otherwise constitutes prior art under the applicable statutory provisions; or is known to be relevant to an attempt to solve any problem with which this specification is concerned.

Currently, there is no known hardware configuration or software program which deploys a substantial change of protocol or content to eliminate the action of data coming from a server completely or partially.

SUMMARY OF THE INVENTION

The decoupling firewall of the present invention provides a system and method to eliminate the power of malware over a user's computer, embedded computer or computer system by stopping the propagation of volatile data. The inventive method separates volatile data by decoupling information from volatile code and further breaks the IP communications between endpoints using connection protocol changes, sometimes referred to as transport protocol translation, thus eliminating direct communications which could translate into the opportunity for a malicious software attack. The decoupling firewall eliminates malware communications between source and destination, by using disassembly, abstraction and pacification methods on volatile data, which prevents penetration of the protected computer systems from the most adaptive malware or side channel attack. The decoupling firewall has other configurations and uses, one of which establishes a method for secure bi-directional information sharing with protection methods for both the information provider and the receiver.

In one embodiment, a method for preventing the transmission of volatile data between a server and a client is provided. The method includes, communicating, from a client to a Landing module of a decoupling firewall, a request for data from a server using a first protocol and communicating, from the Landing module to a Lead module of the decoupling firewall, the request for data using a second protocol that is different than the first protocol. The method further includes, communicating, from the Lead module to the server, the request for data using a third protocol that is different from the second and receiving, from the server to the Lead module, the requested data using the third protocol, the requested data being considered volatile data as it contains volatile code which can change the state of the recipient computer system such as a hyperlink or virus. Volatile data consists of volatile code and non-volatile information, here after called information which cannot change the state of a computer system such as text or a photo. The Lead module then decouples the volatile code from the requested data to separate the volatile code from the non-volatile information. The Lead module then communicates the non-volatile information to the Landing module using the second protocol and does not communicate the volatile data from the Lead module to the Landing module. In an additional embodiment, the Lead module converts the volatile data to a non-volatile representation of the volatile data and communicates the non-volatile representation of the volatile data to the Landing module. However, a method to access the volatile code remotely is established by the Lead module and the Landing module. The Landing module then communicates the non-volatile data and method to the client using the first protocol, thereby preventing the transmission of volatile data between the server and the client while maintaining functionality.

In an additional embodiment, a system for preventing the transmission of volatile data between a server and a client is provided. The system includes a decoupling firewall comprising a Landing module coupled to a Lead module. The Landing module is configured for receiving, from a client, a request for data from a server using a first protocol and for communicating the request to the Lead module using a second protocol that is different than the first protocol. The Lead module is configured for communicating the request for data to the server using a third protocol that is different from the second and receiving, from the server to the Lead module, the requested data using the third protocol, the requested data being considered volatile data as it contains volatile code which can change the state of the recipient computer system such as a hyperlink or virus. Volatile data consists of volatile code and non-volatile information, here after called information which cannot change the state of a computer system such as text or a photo. The Lead module then decouples the volatile code from the requested data to separate the volatile code from the non-volatile information. The Lead module then communicates the non-volatile information to the Landing module using the second protocol and does not communicate the volatile data from the Lead module to the Landing module. In an additional embodiment, the Lead module is configured for converting the volatile data to a non-volatile representation of the volatile data and then communicating the non-volatile representation of the volatile data to the Landing module. However, a method to access the volatile code remotely is established by the Lead module and the Landing module. The Landing module then communicates the non-volatile data and method to the client using the first protocol, thereby preventing the transmission of volatile data between the server and the client while maintaining functionality.

The decoupling firewall breaks communications at and above the IP layer, such as the TCP connection, in a new and unique way by segmenting the end to end communications protocol between two communications partners such as a server and workstation, thus separating the single communication into two separate and isolated connections, each terminating on the firewall. The decoupling firewall inserts an additional communications protocol or transport protocol in a portion of the path which passes the information in a controllable method while retaining the information content present in the original sender's data. A less volatile, in some methods visual or in other methods object substitution, representation of the data is passed by the decoupling firewall, which is unlike the formerly end to end communications among two partners, such that direct communications at a data level no longer directly occurs when the firewall is performing in higher security modes.

The transport protocol transformation, content conversion and data abstraction methods de-couple the information from the effect the volatile code can have on the ultimate client recipient. Thus, this unlinking or decoupling of information and volatile code eliminates the passing of active content, such as commands or instructions which can change the state to or cause action to occur on the client computer by data transmitted from the original server source. Data flow from the source, thereby unknown and considered volatile terminates at the decoupling firewall but information or non-volatile content continues to flow to the destination.

By breaking the communications across two or more components contained in the decoupling firewall, and also implementing a significant change of transport protocols or path between the communications partners, implemented with two components in one embodiment, the decoupling firewall uniquely creates the equivalent of an impenetrable air gap. This prevents even the most sophisticated malware from morphing to bypass the measures.

No malware can be communicated to the computer from the server when the decoupling firewall of the present invention is working as intended. By analogy, kissing someone in person can transmit a virus or cold from one person to another, but kissing an image on a video phone call cannot. Similarly volatile data or code cannot be communicated across the decoupling firewall if configured to prohibit the volatile communications.

The decoupling firewall is constituted of hardware or software or a combination thereof, which permits the communication of information without direct transmission of unaltered data, between a specific device or computer and one or more communications partners.

A feature of the decoupling firewall, when it is functioning properly and in use, is the interception of communications between a destination, such as a user's computer and a source such as a server, such that no malware, data or code will pass to the client computer from the server, nor will the client computer perform any action based upon communications with the server. Because of the features of the decoupling firewall it is perceived to be impossible or extremely implausible for malware to morph into something which will propagate to the client computer without some other form of back channel communication.

The decoupling firewall only permits specific communications, but can adapt to balance security postures which permit a blend of communications in a secure method.

The feature described is a significant departure from current technology and strategies for combating computer viruses including the most recent developments. Today's best methods to prevent or eliminate computer viruses, contracted from an Internet connection, on client computers involve anti-virus or malware protection software on a host, host based intrusion detection and network based instruction detection. There are no devices or software programs which use the technique described below of complete de-coupling information from the data packets by converting the data into a non-volatile method of communications by using an intermediate protocol translation which is the basis of the invention and abstraction methods. The present invention does not eliminate the usefulness of the existing methods, just redirects how and where they will be used in a security architecture.

A practical expectation from implementation of the invention is achieved by inserting technologies which break the communications path thereby eliminating problems which occur from direct connection between a communication partner and the user's client computer, a point which is both unique and the solution non-obvious to those in the field. Viruses, malware, modifications to the client computer, storage of cookies on the user's client computer are all eliminated through proper use of the invention.

BRIEF DESCRIPTION OF THE DRAWINGS

FIG. 21 is an illustration of the Pseudo Code for Client Computer Software and Landing Machine Software in accordance with an embodiment of the invention.

FIG. 22 is an illustration of the Pseudo Code for Lead Machine Software in accordance with an embodiment of the invention.

FIG. 24 is a flow diagram illustrating the Content Conversion and Protocol Translation Methods and Decoupling Firewall Processes in accordance with an embodiment of the invention.

DETAILED DESCRIPTION OF THE INVENTION

Figure 1:
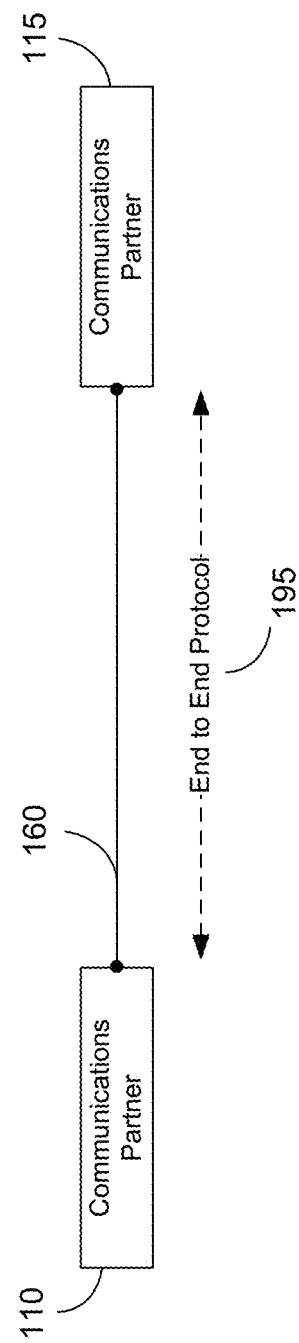
FIG. 1 is a diagrammatic view of an end to end communications over IP between communications partners on a network as is known in the art

As described herein, the decoupling firewall may be implemented in diverse ways, as described in detailed systems and methods with illustrations, however it is not limited to the embodiments or instantiations demonstrated.

Generally, the invention may be implemented in the form of a single device or spread across devices in hardware and software methods, as described. The scalability of the system is not known to have bound other than practical limits involving device hardware limitations such as quantity of volatile memory. The methods may be implemented in compound ways to form new hardware and software embodiments and additional secure communications paradigms.

In brief, information decoupling occurs when the invention converts volatile data that may interact with a computer into volatile code and non-volatile information, here after referred to as information, which uses a method of content conversion for the volatile code or a method of substitution of objects for volatile code and recombination of substituted objects and information to convey informational content with reduced volatility or no volatility. As an example of the invention, a web page is shown going through the process of content converted to a video image of the web page and presented to the user, alternatively a web page can have its active links replaced by an object which abstracts the original link and presents a non-volatile representation to the user however, the invention is not limited to these methods of conversion or substitution. Further, limited reverse propagation occurs when the end to end IP communications between a sending computer on the outside of the firewall and a receiver on the inside of the firewall does not exist or is limited to only the sending of control such as mouse and keyboard output, thereby eliminating an uncontrolled outbound path; thus communication from the protected side to the unprotected side is controlled preventing such things as the participation in botnets as feedback is not possible. The decoupling firewall internally or in a distributed method translates the transport protocols in order to provide a discontiguous path from the source to the receiver. This method of fragmenting the transport protocol from in one embodiment from Ethernet to USB to Ethernet requires that the decoupling firewall actively participate in the change of protocol and enforce its decision process. The decoupling firewall thus must exercise two significant decisions in permitting the communications between a protected host and an unprotected host, what is permitted to pass, and how to encapsulate the communications such that it can pass. The method is described wherein termination occurs twice within subsystems, but it is envisioned that this method may use more transport protocols or perhaps fewer terminations under certain instances. These methods and subsystems which support the methods are described in the decoupling firewall of the invention.

This fragmentation of the communications path and corresponding transformation or translation of the data between two communications partners is intended to control or eliminate unknown, unintended or unwelcome behavior from one of the communications partners toward the other. In one instantiation, the unlinking of volatile data from information is applied to eliminate direct interaction between a remote communication partner and a user's computer and in turn to eliminate malware interactions between the user's computer and an remote communication partner, such as can be found on the Internet, corporate network, partner networks or Extranet. Other benefits of the features are present in an embodiment with the use of two decoupling firewalls in architectures which support the bidirectional sharing of information across agencies or with an embodiment for an embedded system such as a credit card terminal, which can be created from the here within described components.

The invention can be used or implemented in many diverse ways. The invention, if properly implemented, could be provided as a service via additional software or hardware which permits users to connect their computers to the Internet or any untrusted network without the risk of malware being passed to their client computer. It is envisioned that the invention could be created in the form of a single device or distributed set of hardware which can be deployed to a business to eliminate risk of infection or interaction of business computers with malicious software due to direct software connection, or direct communications, with devices. Alternative instantiations of the invention are conceived involving variations of the features deployed.

One embodiment and method of implementing the features described above, and the inherent characteristic of the invention, is to completely interrupt the end to end communications path of a protocol with transport protocol translation, and also convert the intermediate data contained within the protocol into another form through content conversion methods which retain the information without the volatility of executable commands.

In an embodiment, the implementation methods can be demonstrated using at least one content conversion in combination with a protocol translation and an encapsulation method with command, control and viewing mechanisms, implemented in two separate modules which could be realized in real or virtual machines (VMs) on the same hardware, such as an FPGA or multi-chip logic board or physically separate hardware.

In this detailed embodiment or conceptualization, the implementation of the decoupling firewall may be instantiated in two intermediate computers, components or modules, which are used to intercept traffic bidirectionally between a client and server and provide a unique technique involving the implementation of an additional connection protocol or transport protocol, between the intermediate computers, which is described in detail later in this document. The location of where the connection protocol is instantiated is shown to be adjustable in several methods described, but is not limited to those here within described.

A technique will be illustrated which will clarify how the invention will decouple the commands, referred to as volatile code, contained in volatile data from the information being conveyed and therefore provide the safe isolation of the client from the server as intended. Further in this detailed embodiment, the client is protected by the decoupling firewall, sometimes referred to in the art as inside the firewall and the server is not protected by the decoupling firewall, sometimes referred to in the art as outside the firewall.

Further in this detailed embodiment, the decoupling firewall, intercepts a web page or uniform resource locator (URL) request, sent from a user's computer via a browser with an appropriate plugin, to an web server application hosted by an Internet server. The user's computer is said to be on the inside of the firewall and the Internet server on the outside. The user's computer opens a TCP/IP session with the firewall's internally facing component also referred to as Landing Machine, Landing Module or Landing Subsystem. The plugin on the user's browser will send only serial output from the user's keyboard and mouse to or through the Landing Machine, and additionally the plugin will receive only video input from or through the decoupling firewall's Landing Machine; the plugin will not interfere with the mouse and keyboard's local interaction with software or the browser.

Further, in the embodiment, the decoupling firewall's internally facing component is connected via a serial connection and a video connection to the firewall's externally facing component, also referred to as Lead Machine, Lead Module or Lead Subsystem. The decoupling firewall's Lead Machine sends video output to the Landing Machine over the video connection. The decoupling firewall's Landing Machine sends the received video over TCP/IP to the browser on the user's computer. The user's computer sends keyboard and mouse control commands to the Landing Module over TCP/IP. The Landing Module sends keyboard and mouse control commands to the Lead Module over the serial connection.

The browser on the Lead Module responds to the keyboard and mouse commands with video output from the Lead Module displaying the corresponding window on the user's computer; additionally the browser on the Lead Module communicates with the server on the Internet. The server on the Internet sends volatile data, some of which may be interpreted as commands also called volatile code, to the Lead Machine which participates with the server in the role of client through the Lead Module's client browser. The Lead Machine receives the data from the Internet server and converts the volatile data to video, or video output which it sends via the Landing Module to the user's computer.

Further in this embodiment, the communications stream is thereby converted to a completely non-volatile stream of video which cannot be communicate or be disturbed by malware other than by interruption which is alternatively addressed by a feature of the decoupling firewall or method of implementation.

Further in this embodiment, all communications between the Lead Module and Landing Module use USB as a communications or transport protocol for keyboard and mouse output from the Landing Module to the Lead Module and USB for video output from the Lead Module to the Landing Module.

Further limited directionality of communications streams and additional methods of content conversion will become evident as additional embodiments are depicted.

Figure 4:
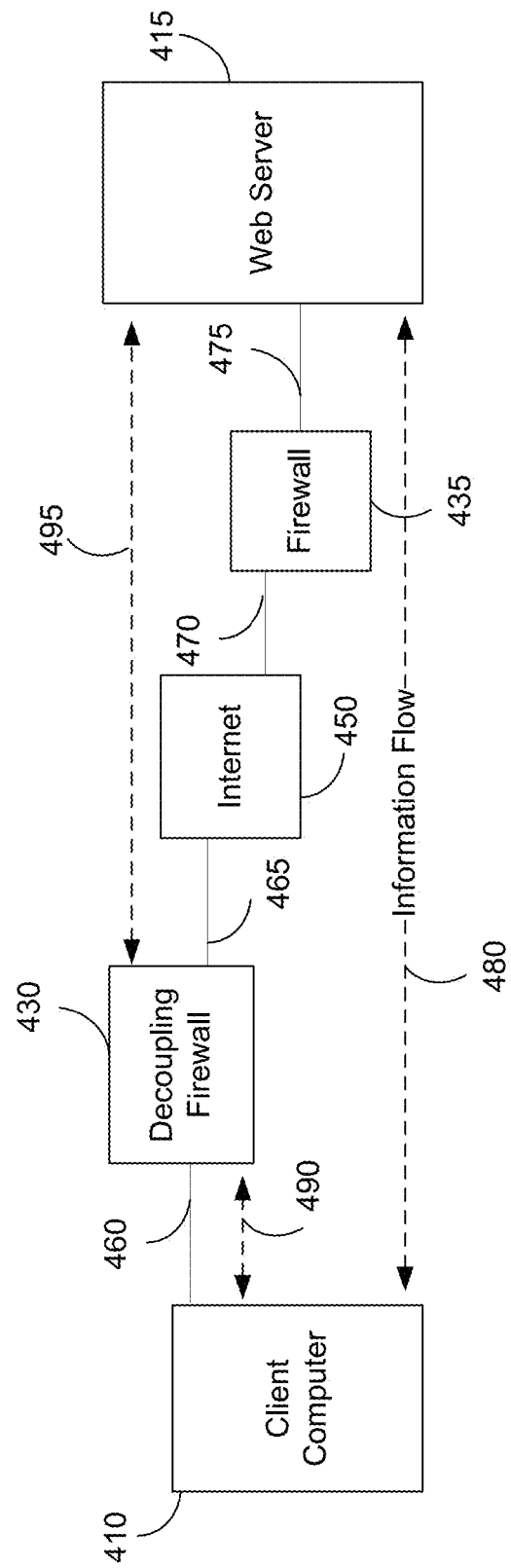
FIG. 4 is a diagrammatic view of the decoupling of Volatile Code and Non-Volatile Information in accordance with an embodiment of the present invention.

In one embodiment, as shown in FIG. 4, the decoupling firewall 430 of the present invention is placed in the communications path 460, 465 between the first communications partner, shown as a client computer 410 and the second communications partner, shown as a web server 415. The client computer behaves as a requester of data and the destination whereas the web server is requested to provide data and is the source of the data. The web server 415 is reachable via the Internet 450, over a connection 465 which requires a method of security. The security method is intended to protect the client computer 410 which is located on the inside of the decoupling firewall. A connection may consist of items such as physical links, switches, routers, firewalls and networks.

In one method of use of the decoupling firewall, the client 410 opens a web browser and initiates communications to the server 415 by entering a URL. In an embodiment to support the method of use, when the client 410 opens a communication to retrieve a web page from the server 415, the HTTP request is supported by the TCP/IP protocol stack and a 3-way handshake is initiated by the client 410 to the web server 415, which is however intercepted by the decoupling firewall 430. In an alternative embodiment to support the method of use, when the client 410 opens a communication to retrieve a web page from the server 415, the HTTP request is intercepted by a script on the client computer which forwards only mouse, keyboard output in addition to sound and video if needed to a component of the decoupling firewall for further processing.

Without the decoupling firewall, such as is shown in FIG. 1, the TCP/IP protocol stack, using TCP and IP to support the communications, would have a direct path between the two communications partners 110, 115; the TCP 3-way handshake would occur between the client 110 and the server 115 and a direct connection between the client 110 and server 115 would be established. There is, in the absence of the decoupling firewall, an end to end relationship of the TCP and the IP protocols, in which the content of the TCP segment such as an HTTP GET request will be unchanged from source 110 to destination 115, as will other Ethernet Frame or IP packet content.

Figure 2:
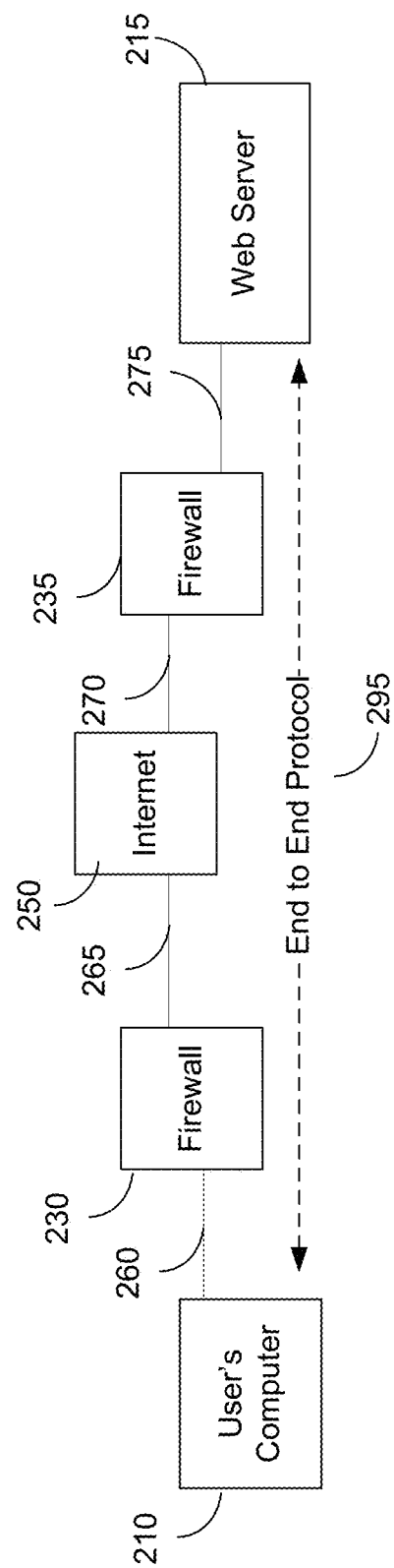
FIG. 2 is a diagrammatic view of an end to end connection between a Browser and an HTTP Server Application on network connected communications partners as is known in the art

FIG. 2, shows that even with the addition of firewall devices 230, 235 to the network path 260, 265, the end to end communications 295 is without change and a direct communications can occur between the user's computer 210 and web server 215, making it possible that a TCP 3-way handshake occur and that volatile data on one system be communicated directly to another, described in detail later in the description of the invention. Unrelated changes are introduced by existing firewalls in the area of network address translation in the firewall 230 which changes the IP address, or proxy methods, neither of which effects the end to end propagation of volatile data from the web server 415 to the client computer 410.

FIG. 4 does not show any end to end path for the communication of data, but a path from the web server 415, or other communications source across a connection 475 which could comprise links, network switches, routers and other network communications equipment. It is common for a server 415 to be protected at the edge of a network under a single administrative domain by a firewall 435 which is also connected to the Internet or otherwise network which is untrusted or otherwise administered by untrusted or unknown entities 450 through a connection 470 which can comprise network devices that pass network traffic such as IP.

The insertion of the decoupling firewall 430 into the communications path 465, 460 causes the fragmenting, breaking or partitioning of the prior end to end communications flow over a transport protocol 195, 295 into two separate flows over two separate transportation protocols 495, 490. It is said that they are separate flows and separate transportation protocols because any 3-way handshake would be established with the decoupling firewall 430 and the web server 415; any other transport protocol such as UDP, IPSEC or IP protocol would also terminate at the decoupling firewall and in some embodiments all protocols terminate and originate at the decoupling firewall. Volatile data, sometimes called volatile data path or volatile flow, flows in the path 495 from the web server 415 to the decoupling firewall 430 and terminates at the decoupling firewall 430. Non-volatile data such as information, sound and video flows, sometimes called a non-volatile data path flow or non-volatile flow, in the path 490 from the decoupling firewall 430 to the client computer 410 over the connection 460 which can, but is not required to contain links and network communications equipment. The non-volatile data path flow 490 is created by the invention to provide firewall security measures for the client computer 410 in addition to the network links and network devices 460 which are protected on the inside of the decoupling firewall from the Internet 450 and devices on the Internet 450, 435, 415, 465, 470 and 475. Objects 465, 450, 470, 435, 475, 415 in FIG. 4, which are to the right of 430 are considered to be on the outside of the decoupling firewall 430, while objects 410, 460 which are to the left of the decoupling firewall 430 in FIG. 4, are considered to be on the inside.

Further, in this embodiment, the flow of information 480 occurs as a combination of the volatile data communications on data path 495, and a separate content conversion method and a method that imposes a change of transport protocol described here within, which occurs in the decoupling firewall 430, and the non-volatile communications path 490. Volatile data is similar to the existing end to end communications 195, 295 and in FIG. 3, end to end communications 395 as it occurs now over the Internet or other network between two communications partners, without the decoupling firewall 430. The firewall 430 terminates the volatile data communications, not permitting the volatile data communications to pass to the client 410.

In one use case scenario, the web server 415 application is Apache which serves web pages with HTML, the server protocol is TCP/IP, the application making the request for volatile data 495 is a browser on the client, the client protocol is TCP/IP and the non-volatile data 490 content is video, the protocol is TCP/IP.

The application of the decoupling firewall is not limited with respect to software applications, such as web server and browser or use case scenarios or otherwise in architecture as will be illustrated in part with additional diagrams.

In one embodiment, application and use case, the software application is a video chat application on the client 410, and the server 415, the server protocols TCP, UDP over various ports which terminate on the decoupling firewall, the client transport protocol TCP, UDP over various ports carrying video, mouse and keyboard data to the decoupling firewall and portions of the communications traffic is encrypted.

Figure 5:
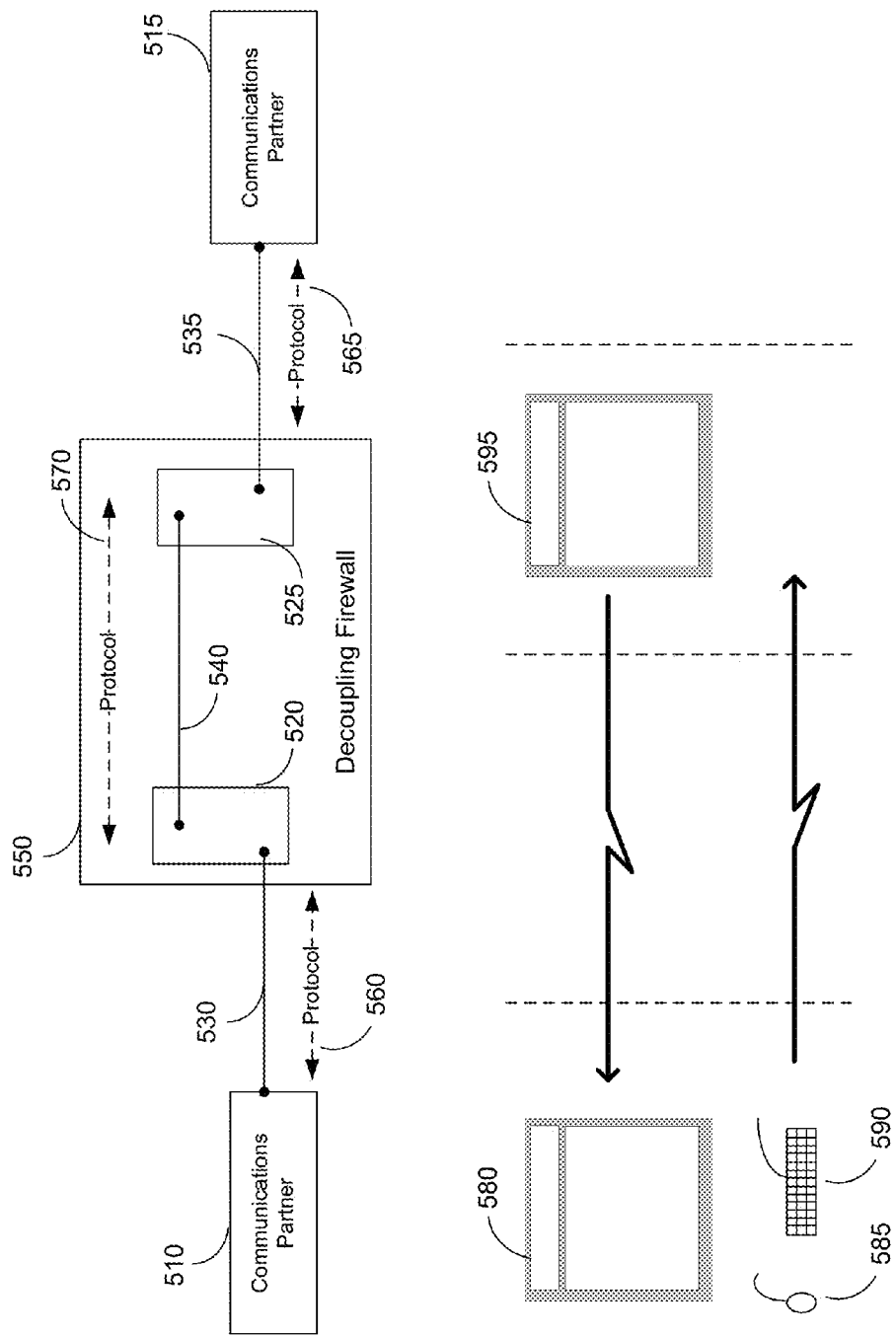
FIG. 5 is a diagrammatic view of the major components and protocol changes in the decoupling firewall and non-volatile content exchange with the decoupling firewall in accordance with an embodiment of the present invention.

In one instantiation, as shown in FIG. 5, the decoupling firewall 550 is located between two communications partners 510, 515. The invention terminates a volatile flow over a protocol 565 on a component 525 of the decoupling firewall 550. The transport protocol 565 shown here could be IP and TCP which carries additional content such as HTTP which is considered volatile data. The termination of the volatile data communications 565, like flow 495 shown before in FIG. 4, is a termination of one side of the communications which occurs over the link and network devices 535 between the decoupling firewall 550 and the communications partner 515. An example protocol for connection 565 would be TCP/IP, UDP or IPSEC.

Within one embodiment of the decoupling firewall a distinct and separate protocol 570, which is not the protocol 565, occurs between the outside protocol termination point 525 and the inside protocol termination point 520 of the decoupling firewall 550. This alternative protocol 570, which is internal to the decoupling firewall 550, occurs over a connection 540 which terminates on the decoupling firewalls two components 520, 525. The protocol is shown to be passing in both directions, but implementation later described with reference to FIG. 8, clarifies the two communications can be unidirectional and independent. An example protocol for connection 540 would be independent unidirectional protocols or content streams over USB such as control data, video and sound from component 520 to component 525 and composite information and substituted objects with video and sound from component 525 to component 520. Composite information contains both non-volatile information in original form and volatile code which has been transformed to a non-volatile state. The component 525 can also referred to as or may contain the Lead Module, Lead Machine or Lead Subsystem; the component 520 is also referred to as or may contain the Landing Module, Landing Machine or Landing Subsystem.

The inside termination point 520 for the second protocol 570 internal to the decoupling firewall 550 is also the originating device of the independent third protocol 560 which carries the information or non-volatile data communications 490, shown previously in FIG. 4. In some embodiments the third and first protocols may be substantially or partially the same.

The connection is shown as bidirectional 560 over link 530 between communications partner 510 and the decoupling firewall 550 is further explained to involve various types of communications channels such as unidirectional or unidirectional in part, communications or communications streams operating over 560. An example protocol for 560 would be TCP/IP or IPSEC.

In one embodiment, communications between communications partners 510, 550 may be further divided into separate channels which may consist of a control channel which passes over 530. It is envisioned that a more complete or various embodiments will contain multiple control channels which are unidirectional or bidirectional as necessitated by the use case scenario.

In an embodiment, the decoupling firewall 550 consists of two separate and unique computing systems 520, 525. The protocol 565 is a TCP/IP connection to the communications partner 515 such as a web server. The web server 515 has no knowledge of the decoupling firewall 550 and will have no indication of the decoupling firewall 550 being any different from any other communications partner from the communications. The implementation may have additional differences which protect user information, but the server 515 is envisioned as being unaware of this difference.

In some instantiations, the invention will consist of two separate subsystems such as computers 520, 525 which communicate via an alternative protocol set 570, across a connection or connections 540. In some instantiations, the communications partner 510, such as a client computer, will communicate with the invention 550, by establishing a TCP/IP or alternate protocol connection to one of the subsystems 520 over network links and devices such as, switches, routers, firewalls 530.

Two methods of content conversion are presented, but it is envisioned that content conversion may occur in other ways. The simplified method of content conversion is illustrated by example in FIG. 5. Volatile data in a communications partner 515, here a web server is shown in browser window 595 from component 525 which is converted into non-volatile data or information, sound and video which is displayed or represented in a browser window 580 on communications partner, here a client 510. The browser window or portions thereof which are non-volatile such as information, sound and video are sent from the Lead Module 525 to the Landing Module over protocol 570 for transmission over protocol 560 to the client 510. One content conversion method implemented by the decoupling firewall sends the an image of the browser as video over an alternate protocol 570; another content conversion method distributed in the components of the decoupling firewall separates volatile data into volatile code and information, converts volatile code, which can be converted to information, into composite information, substitutes objects for volatile code which cannot be converted, combines information and substituted objects, and directs the composite information and objects to the client over protocol 560; the protocol 570 is also used in this distributed process or method. Control of the browser window 595 is with mouse 585 and keyboard 590 on communications partner 510.

The volatile data may terminate in other ways on the decoupling firewall, such as demonstrated in, but not limited to other embodiments shown here within.

Figure 6:
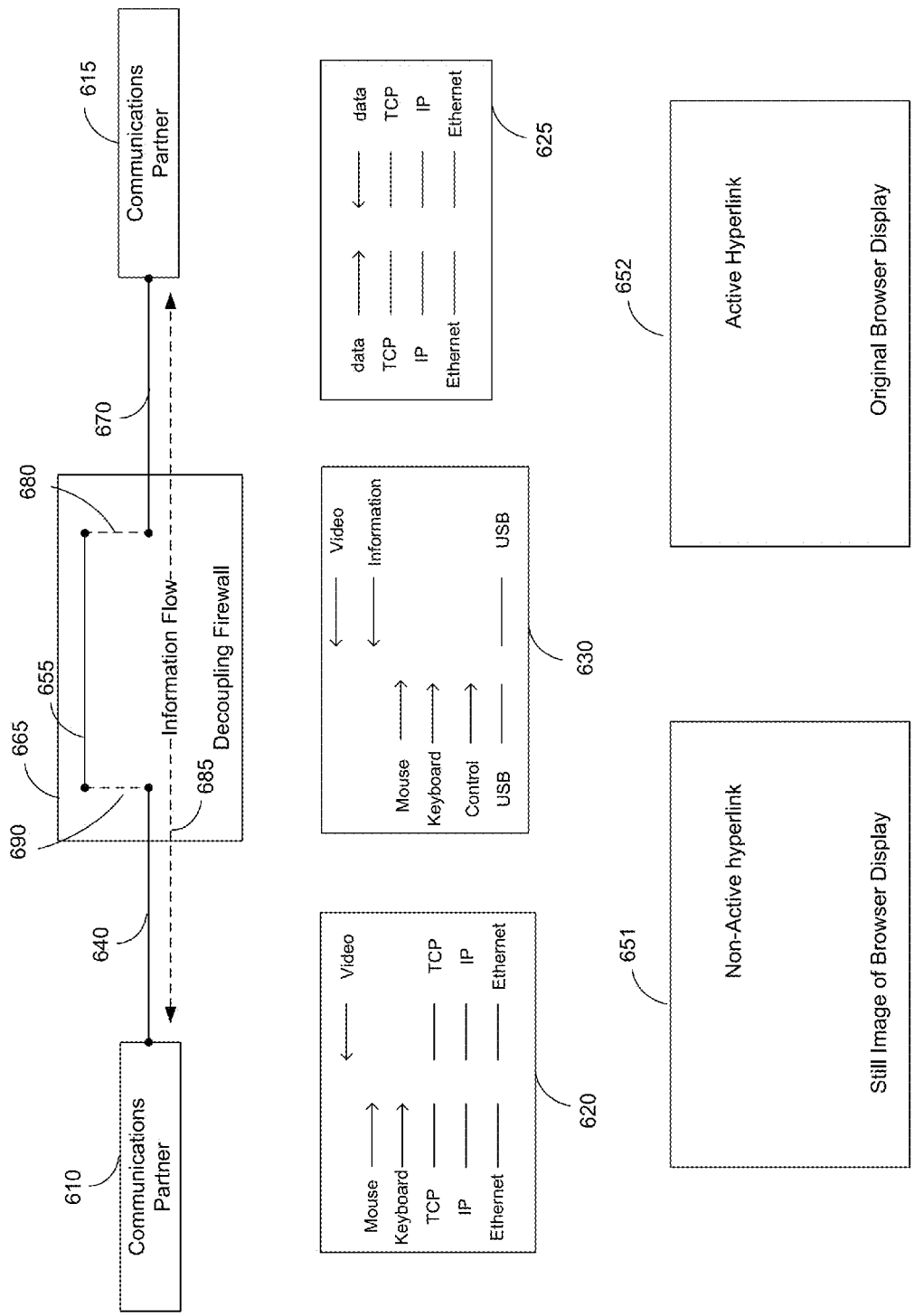
FIG. 6 is an illustration of a first method of protocol variations information decoupling in accordance with an embodiment of the present invention.

FIG. 6, shows, in one embodiment, the decoupling firewall's 665 method of limited propagation by protocol translation from protocol 670 to protocol 655 to protocol 640. The entire length of the information flow 685 uses multiple protocols and alternative protocol stacks. The data which a communications partner, here a client computer 610, requests from a communications partner, here a server 615, is still communicated, however over a path in which portions of the protocol stack, also called the transport protocol referring to transport protocol translation such as individual or groups of protocols or the entire protocol stack, changes. Volatile data is however not transmitted from client to server or from server to client. The path is uniquely fragmented between the Lead and Landing modules described here within by a complete change of protocol twice in a way which is more than simple termination of the communications as performed in a proxy or other existing method.

Further as shown in the implementation, the protocol stack used by the decoupling firewall used over connection or pathway 670 can be TCP/IP over Ethernet 625 and contains data such as volatile data containing volatile code, HTTP, SQL, information, sound, video other content. The protocol stack used over connection or pathway 655 is USB 630 which carries video, keyboard and mouse control commands in raw format or over channels such as a control channel or information channel over one or multiple control channels. The protocol stack over connection or pathway 640 is TCP/IP over Ethernet 620 which carries control and information, sound and video in a format where there are no control channels such that no transport or higher layer protocols 630 from within the firewall 665, which are used such as USB or protocols over USB 630 extend beyond the firewall, and protocols 620, are unique to connection 640 between the client 610 and the decoupling firewall 665. However, intended information above the protocol layer such as keyboard, mouse and video can be the same or similar depending on the methods of content conversion applied in the decoupling firewall 665. The protocols may be asymmetric across a link carrying the application layer data over a protocol in one direction such as control data, but others may send data in both directions such as video data. Logic within the decoupling firewall 665 can control the use of video in either both directions or one direction in a single application based on options provided to the maintaining firewall engineer. Many protocol alternatives and options are envisioned as possible depending on the particular embodiment. It is not required that the control, such as keyboard or mouse, sent over path 640 and path 655 are the same, as control data abstraction processes such as interpretation, table lookup and modification may be used for security enhancement of the decoupling firewall.

The decoupling firewall 665 transforms or converts active data also called volatile data to passive data also called non-volatile data along the path from one communications partner 615 to another communications partner 610. This process of information decoupling 680 occurs when the active data is received, from the communications partner 615 over the transport protocol communications set 625, by a subcomponent process 680. Information decoupling takes the volatile data and isolates the information from the volatile code which can cause a change on the recipient, thus is representational of all malicious software, such as malware, viruses and trojans. The volatile to non-volatile data conversion a part of content conversion is represented by dashed line 680 and changes the data such that it cannot interact with the client computer 610 when it is forwarded across the transport protocol communications set 630 toward the client 610. Thus at 680 the data is converted into information without volatility and without the ability to illicit a response from any recipient 610; the information is unable to modify or change the state of any process or invoke any kernel syscall or invoke a command in any software or operating system.

The content conversion can also include a application imaging method to eliminate the passing of volatile code over the connection 655 or a substitution of volatile code with an object from a lookup table on the Lead Module. The Landing Module may further, through predefined lookup table, provide an additional layer of abstraction. As an example, an application using an SQL query served by an application on communications partner 615 may be offering to inject malware if a link with a given command is issued. The Landing Module may have predefined SQL commands which are issued directly to partner 615 thereby bypassing the malware, thus preventing the decoupling firewall from ever receiving the malware, also known as volatile code, thereby protecting both the client and the decoupling firewall. Subsequent assembly of the substituted objects, application or object level video capture and substitution and display to a user are part of the content conversion method.

The Lead Module, depicted in FIG. 5 as 525, in the decoupling firewall allows the normal functions of a typical client application or process 680 to interact with the volatile commands received from communications partner 615 which may cause an action to occur within the decoupling firewall; it is the content conversion method which converts the volatile data to a non-volatile information such as application of object level video capture, via frame buffer reads, screen capture or other devised methods. The process in one embodiment takes the interactive browser display 652 on the Lead Machine and uses an object capture, substitution, assembly and display method to obtain an image of an object in the display 652 such as the object labeled as 'Active Hyperlink' and converts it via the method to a browser object in the display 651, labeled 'Non-Active Hyperlink'. The browser display 652 is that of a normal browser in that the hyperlink may be clicked with a mouse and, if the code which is called issues a command to the application, operating system or other software or hardware command with the proper permissions, an action occurs. Similarly the browser display 651 is like that of a normal browser that the hyperlink can be clicked, except that the content conversion process has added additional abstraction which permits insertion of differing functionality to protect the security of the client 610, such that when "Non-Active Hyperlink" when clicked on the copy of the hyperlink will have no effect of any kind on the client 610. In some embodiments a software method exists to send the mouse click over paths 620, 630 to the process 680 running on the Lead Machine. The wording for the hyperlink is different for illustrative purposes as the image 651 is a replication of 652 and the user would be unaware that the mouse click on the local image on 610 would carry out an action in the decoupling firewall 665, and the results of that action would again be an iterative process involving content conversion and function such that motion like mouse movement, and Adobe Flash movement on the Lead Module could be conveyed via application object capture or if determined non-volatile by method to be sent to the client 610 by process 680, to indicate motion or progress such as video or use video.

The decoupling process 680 represents the methods including protocol translation and content conversion. The process 690 is envisioned as a reverse of 680, but may contain other elements such as additional control data terminating on the Landing Module shown in FIG. 5 as 520.

In some embodiments, the protocol communications set 655 occurs strictly within the decoupling firewall and the invention terminates a protocol communications set 640 with the communications partner 610 over a series of links, switches, routers, firewalls and other network devices. The decoupling firewall 665 may terminate the protocol set 670 with communications partner 615 over a series of links, switches, routers, firewalls and other network devices such as shown in FIG. 6. However, the overall flow of information still exists between communications partners 610, 615, such that the user can request information from the server and receive information.

In an embodiment, the decoupling method 680 may occur within a single hardware device and is implemented in hardware or software, it may also occur across hardware and software processes. Process 680 is not required to convert volatile data to video as shown in 630, but may represent software which extracts non-volatile data such as text in one step and sends the information for the text to a second module within 680. The second module may substitute the active content with passive content and a control which it instruments and sends it for presentation to the user viewing client 610. The control may be a graphical object viewed on the computer screen which can be clicked which in turn will be intercepted by process 680 and in turn process 680 will transmit the message.

In an embodiment, process 680 and process 690 may represent processes which use other transformation processes and methods of abstraction.

Figure 7:
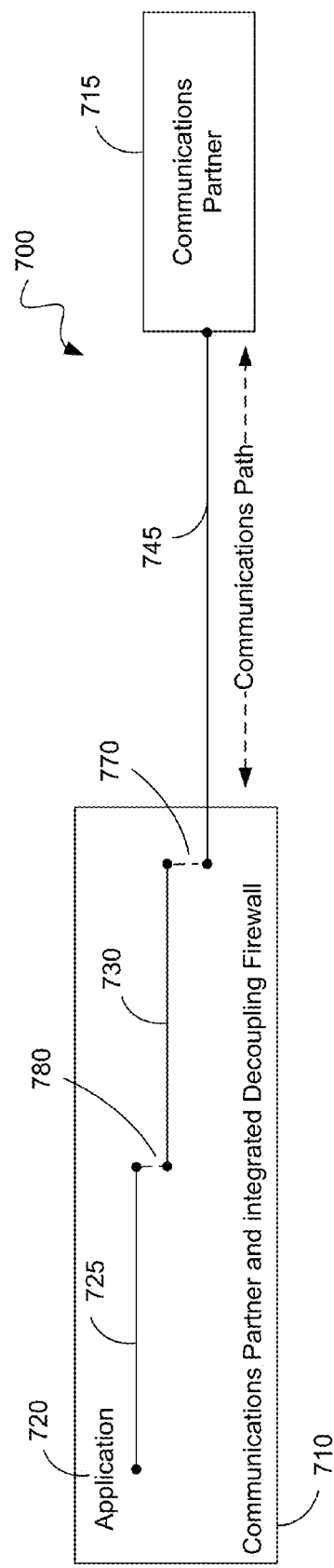
FIG. 7 is an illustration of a second method of protocol variations and information decoupling in accordance with an embodiment of the invention.

It is envisioned as shown in FIG. 7, that one alternative embodiment is to integrate the protocol translations from 745 to 730 and from 730 to 725, and content conversion 770 with the communications partner 710. In some instantiations this could occur with the application, such as a browser, functioning with no additional software and communicating with the TCP/IP protocol stack. Using a technology such as an integrated microprocessor and FGPA would permit additional logic to be implemented by a hardware coding language VHDL or Verilog to permit the additional functions to support protocol translation 770 and additional features. An integrated hardware solution as shown in FIG. 7, is capable of being self-contained in a single physical footprint and portable, such as a phone or tablet computer. Other technologies are envisioned in said embodiment at this time such as integration with various forms of virtualization.

Figure 8:
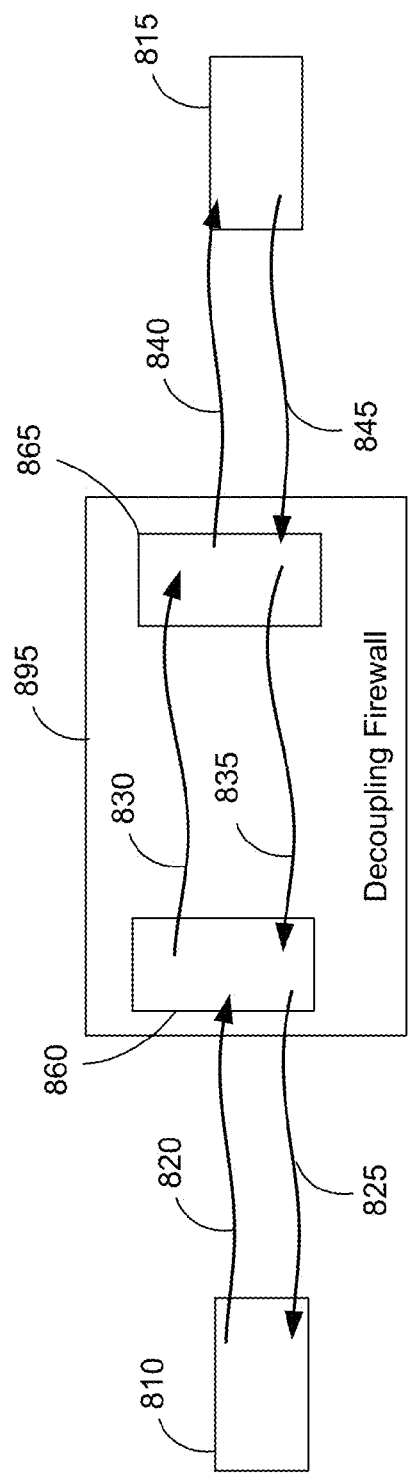
FIG. 8 is an illustration of the data flow through the decoupling firewall to communications partners in accordance with an embodiment of the invention.

In one embodiment shown in FIG. 8, the methods used by the decoupling firewall 895 are depicted communicating with client computer 810, which is seeking to reach another communications partner 815 across an insecure medium, such as the Internet. In one instantiation, the client computer 810 communicates with the Landing Machine 860 of the decoupling firewall 895 by sending Mouse and Keyboard data over a protocol such as TCP/IP to the Landing Machine 860, which is designated as Mouse and Keyboard over TCP/IP 820. Thus the mouse and keyboard which are connected to the computer 810 are sending a limited and controlled set of data in one direction from the computer 810 to the Landing Machine 860 of the decoupling firewall 895. Still further elaboration of the embodiment is that the subsystem 860 sends only Video over IP on the connection 825 from the subsystem 860 to the computer 810. In one instantiation, the computer 810 may be any operating system and the major application could be a web browser with modified behavior by a special plugin or script which captures all Mouse and Keyboard over IP on connection 820 and directs it to a communication path to subsystem 860. The decoupling firewall 895 may involve the use of specially configured or modified kernel software or special drivers or related software.

Communications within the decoupling firewall 895 between the two major components 860, 865, in one instantiation, propagate the mouse and keyboard data over a serial link sometimes called bounded control, such as Serial over USB 830 or modified USB from Landing Machine 860 to Lead Machine 865. Mouse and keyboard data are control features and functions which can cause actions local to the Lead Machine 865 to propagate beyond the component 865 to communications partner 815, or may affect video object capture, substitution or composite assemble of image features directed to subsystem 860. A representative example of an action on the Lead Machine is a request tier exchange of information such as an FTP instruction or HTTP GET. The serial link may be unidirectional and be supported by kernel, driver or software modifications on subsystems 860, 865. Also subsystem 865 sends video or composite object and information over a connection from the Lead Machine 865 to the Landing Machine 860 such as Video over HDMI 835. The Lead and Landing Machines may be appropriately configured via hardware and software for unidirectional communications in the outbound or inbound configuration as needed. For example HDMI inbound logic or another method would be required in the Landing Machine 860 to support the inbound video from the Lead Machine 865. It is envisioned that subsystem 860 also controls what it accepts across the HDMI or other channel in various methods including validation of volatility and proper format described here within in illustrated in FIG. 18 and FIG. 19.

The video broadcast is envisioned to utilize communications broadcast methods such as multicast in certain cases for purposes of scale or specialized embodiments of the decoupling firewall such as for collaboration software or secure online classes.

Completing the communications path for the embodied decoupling firewall 895 to the untrusted web server 815 or communications partner across an unsafe medium is the communications from the Lead Machine 865 to the communications partner 815. In at least one instantiation the HTTP protocol is bi-directional, with the outbound connection 840 supporting HTTP over TCP/IP to the server 815 from the Lead Machine 865 and with inbound communications of HTTP over TCP/IP 845 from the server 815 to the Lead Machine 865.

Figure 9:
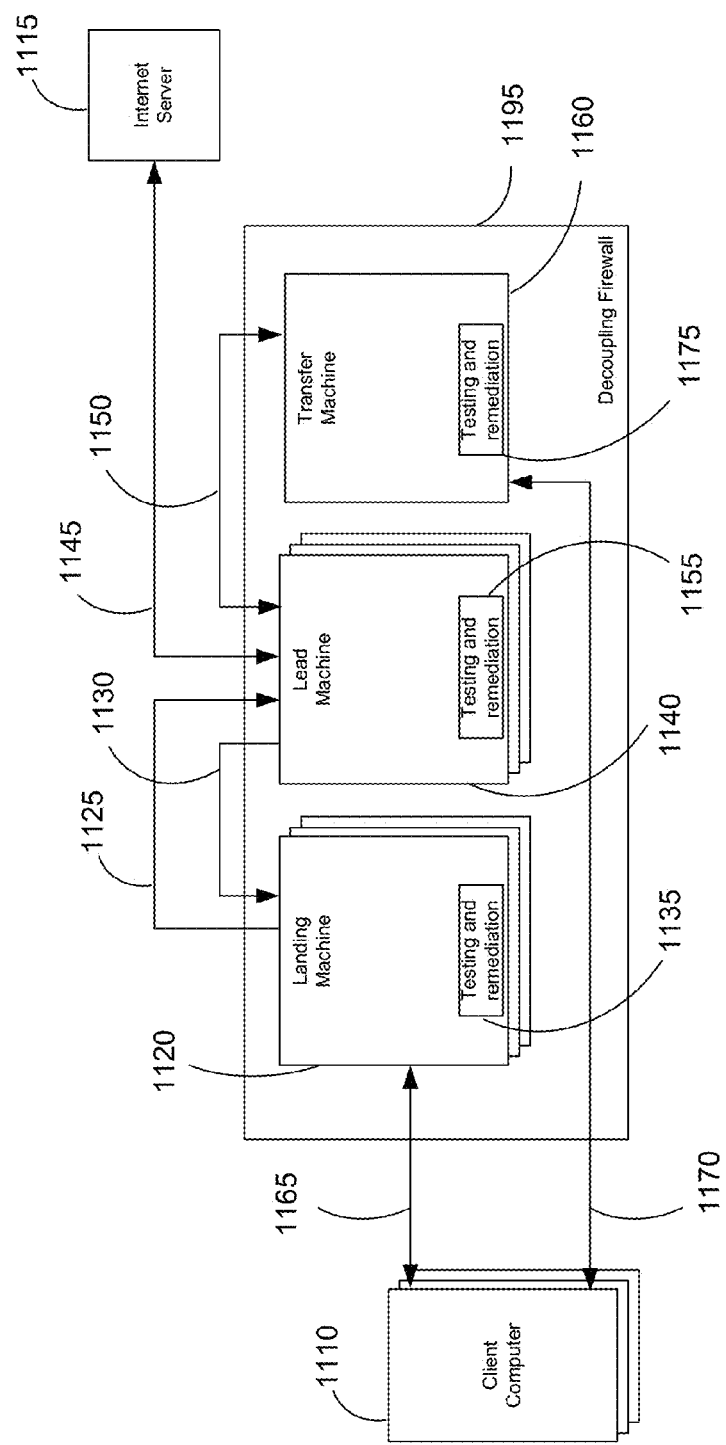
FIG. 9 is an illustration of subsystems, connections and methods in the decoupling firewall in accordance with an embodiment of the invention.

Still another embodiment is shown in FIG. 9, of the decoupling firewall 1195. The client computer 1110 is in a zone or segment of the network considered to require protection from the zone or segment of a network, such as the Internet, where the Internet Server 1115 is located. The client 1110 can be said to be protected by the decoupling firewall 1195 from devices located on the other side of the firewall over connection 1145 which may be links, network devices or computing platforms such as the server 1115.

The communications from the client 1110 to the decoupling firewall 1195 terminates on the Landing Machine 1120 a component of 1195 which in one implementation can be a computer such as the Intel Next Unit of Computing (DCCP847DYE) which contains a small form factor main logic board. The client computer 1110 talks with the component 1120 via a protocol which terminates on both the client 1110 and the Landing Machine 1120. The embodiment further supports two or multiple unidirectional communications over a single USB connection or TCP/IP connection over the links and network devices represented by path 1165. The Landing Machine 1120 in one instantiation is sending video over another protocol such as TCP/IP or USB to the client 1110 over a physical cable or an assortment of intermediate devices on connection or path 1165.

The Landing Machine 1120 in an embodiment will use a method of bounded control over connection 1125 to send control commands, sound or video, unidirectionally to the Lead Machine 1140, another component of the decoupling firewall 1195. The control data may consist only of mouse click and location output and keyboard output originating from the client computer 1110 and supported by software, drivers and kernel modifications on the client 1110, Landing Machine 1120 or the Lead Machine 1140. It is envisioned that other communications may exist between the client 1110 and the Landing Machine 1120 to support additional communications features such as direct, proxied or similar conversion data to support content conversion 680, 770 respectively from FIG. 6 and FIG. 7.

Further, the Landing Machine 1120 may receive video, composite object and information, sound and video from the Lead machine 1140 over a unidirectional communications link 1130 which passes video in one direction, such as HDMI, outbound on the Lead Machine 1140 to HDMI inbound on the Landing Machine 1120. The video on the Landing Machine 1120 may use protocol translation by being further directed across an alternative protocol stack and also may further use a content conversion method to deliver the original video received from the Lead Machine 1140 to the Client Computer 1110. Further, the Lead Machine 1140 may receive mouse and keyboard data or other control channel data from the Landing Machine 1120 which originated on the Client Computer 1110 or the Landing Machine 1120.

In this instantiation, the Lead Machine 1140, a component of the decoupling firewall 1195, procedurally establishes and logically forms one end of the communications with the Internet server 1115. The communications can occur over TCP/IP as normally between clients and servers. The Lead Machine 1140 interacts normally as a client does with the Internet server. In one instantiation the software, drivers and kernel modifications permit content control methods described here within. In one embodiment or method of creating non-volatile data is to capture the results of the browser on the Lead Machine 1140 and convert it to a video or composite object and information, thus non-volatile, which is then sent via software to the Landing Machine 1120 over an internal communications protocol such as an HDMI connection between the Lead Machine 1140 which is feasibly the same Intel NUC over the output port. The second communications protocol is unique in that it is a protocol which cannot be used to connect to the decoupling firewall. The Landing Machine 1120, if sufficiently fitted with an HDMI capture card, can receive the HDMI output from the Lead Machine 1140, thus providing a non-volatile view of the communications with the Internet server 1115. It is not required that the output be video over the HDMI capture card, it may consist of composite objects and information consistent with the methods of content conversion described here within. In this method the unidirectional transfer of non-volatile data or information can be instantiated across a standards based unidirectional HDMI link 1130. Further, via similar unidirectional serial link or similar method, the Landing Machine 1120 sends control data over the link 1125 such as keyboard, mouse and other control commands to the Lead Machine 1140.

A method and system for testing and remediation 1135, 1155, 1175 to replace software, OS or validation methods on the Lead Machine 1120, Landing Machine 1140 and Transfer Machine 1160 exists, in one implementation, to both monitor for variations in the software and to replace software which does not meet the requirements as established for the decoupling firewall. The testing and remediation on the Transfer Machine 1160 also will permit analysis of downloaded Internet software. A process for the transferring of data to and from the Internet server over connection 1150 is envisioned as involving the Transfer Machine 1160 and software which both moves the software and makes it available to the user. The user method for the transferring of data or files directly involves a connection method 1170, such that no direct connection exists between the client and the Internet, without content conversion and a change of protocol. Content conversion is effectively implemented in the outbound direction by only permitting control data from the inside interface of the decoupling firewall, but it may be implemented in other methods. An actual physical air gap or other method involving test and remediation is represented by 1170.

It is envisioned that the communications carried between the client 1110 can also support features as a natural extension of the methods described to support bi-directional video and bi-directional sound between the client 1110, and the server 1115 with or without the need for the methods employed.

As seen in FIG. 9, in order for a user to download a PDF or other file from an untrusted network, the data is transferred to the Transfer Machine 1160. Testing and Remediation (TR) methods are used to validate that the file is verified safe or legitimate and the data is passed to the user in a connection between the Transfer Machine and the Client Computer 1110. The Lead Machine 1140 can exercise similar methods of making the downloaded software non-volatile, such as opening, examining and devolatilization methods described here within.

Figure 10:
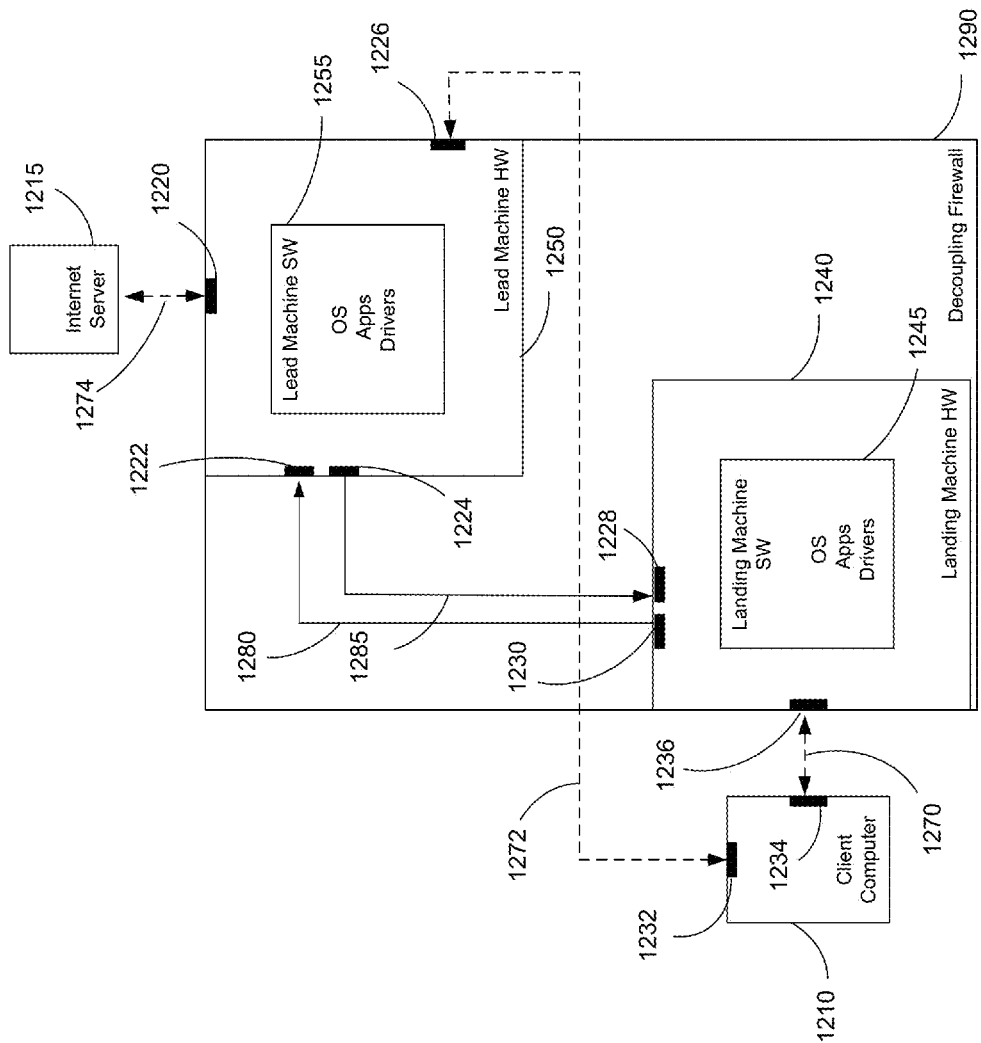
FIG. 10 is an illustration of simple hardware and software models in accordance with an embodiment of the invention.

In one embodiment shown in FIG. 10, the decoupling firewall 1290 consists of two major components, a Lead Machine 1250, or Lead Module, consisting of a logic board, CPU, memory and interfaces and a Landing Machine 1240, or Landing Module, consisting of a logic board, CPU, memory and interfaces. The Lead Machine 1250 is further supported by BIOS, operating system, drivers and software 1255, modified as needed to support the decoupling firewall 1290. The Lead Machine 1250 further has a serial driver, serial port 1222, serial bus, serial cable, which for example, could be a first USB bus, of several in the invention, which permits inbound mouse and keyboard commands transmitted by the Landing Machine 1240 or other such data as required such as outbound files, sound, video and commands. The drivers, applications and operating system kernel are further modified to support the features described. There is additionally a connection 1280, in part or wholly unidirectional between the serial port 1222 on the Lead Machine 1250 and the serial port 1230 on the Landing Machine 1240.

The Lead Machine 1250 further has a video driver for a video port 1224 which further supports outbound video to Landing Machine 1240 out of port 1224 across the connection 1285, in part or wholly unidirectional to the video port 1228 on the Landing Machine 1240. The Landing Machine 1240 further accepts the video inbound over and appropriate video driver and hardware such as a video capture card or other hardware enabled logic which is a part of the Landing Machine 1240.

The unidirectionality in the links 1280, 1285, in one embodiment is constrained by software or hardware, using protocols, drivers, kernel methods and software but is not limited to these. The lack of unidirectionality to support certain types of communication demonstrates the flexibility to integrate with additional pathways, protocols and methods, existing and to be developed to encompass all existing needs of a bi-directional firewall but with the ability to control certain communications as desired.

It is envisioned that the serial ports 1222, 1230, the video ports 1224, 1228 and the connections 1280 and 1285 are realizable in a PC 104 interconnect or some other manner between two logic boards which share a bus structure with or without cabling support for interconnection. The decoupling firewall 1290 is also envisioned as being able to be realized in a single chip or logic board.

The Lead Machine 1250 is envisioned in one use scenario to contact an Internet Web Server 1215 as commanded by the client computer 1210. The Lead Machine 1250 further will open an Internet Browser such as Firefox, mirroring a browser window on the client computer 1210. Browser functionality can alternatively be created in a special purpose application. The user of the client computer 1210 will click on the text box using their local mouse and using their local keyboard connected to the computer 1210, to enter a URL. Furthermore, with the assistance of software on the client computer 1210 such as a java script, plugin or add-on, the keyboard and mouse output, when related to the associated browser on the user computer, will be communicated with the assistance of appropriate software, drivers and kernel modifications to the Landing Machine 1240 through the port 1234, across a physical connection 1270, which may include links and network equipment, to the decoupling firewall 1290. The mouse and keyboard data sent from the client computer 1210 to the invention terminates on port 1236 which is attached to the Landing Machine 1240 component of the invention. In some embodiments, the Landing Machine 1240 further redirects the mouse and keyboard output across the connection 1280 to the Lead Machine 1250 to instruct the Lead Machine 1240 which actions to perform on the Lead Machines browser 1255, such as the keystrokes of the user on 1210. The keystrokes, along with the support of software, pluggin, drivers and kernels will facilitate the entering in of the URL on the Lead Machine 1250 as typed by the user of the client system 1210.

The Lead Machine 1250 will further receive a webpage from the Internet Server 1215 over the port 1220 attached to the Lead Machine 1250 and the results of the receipt of volatile data will be displayed on the Lead Machine 1250 supported by software 1255, viewable by a computer monitor if so configured and attached. The Lead Machine 1250 will capture the result of the webpage displayed on the Lead Machine 1250 and devolatilize it using content conversion to convert it to non-volatile information such as composite objects and information. The resultant conversion, with support of plugins, software, driver and kernel, will be sent through the port 1224 over connection 1285 to the Landing Machine port 1228. In some embodiments, the Landing Machine 1240 will further forward the video with support of software 1245 such as plugins, software, drivers and kernel to the client computer across port 1236 across the connection 1270 consisting of links and network devices to the client computer 1210 for displaying an image of the web page on the Lead Machine 1250.

It is envisioned that the USB port 1226, sustained by proper software 1255 will permit attachment of a USB stick which will permit a user to download or upload files from the client computer to remote devices on the Internet side, untrusted side, or outside 1274 of the decoupling firewall 1290 such as the Internet server 1215. The user may be required to move a USB stick or device between the two interfaces 1226, 1232 across what is known as sneakernet 1272, the manual moving of the USB stick or transport device. Further the USB connection could be permanent with or without other measures of software which support various methods described here within and additional security functions.

It is envisioned that a third mechanism for transfer exist in hardware or software which enables the transfer of files. Further it is envisioned that additional mechanisms required to support the transparent communications of a client and server or for devices on the 'trusted' and 'untrusted' side be developed, such trust relationships to permit rules to be established for which devices can communicate with other devices based on reasons of content, entitlement and enforced by methods involving identifiers in the communications stream, such as IP addresses.

It is further envisioned that the method of content substitution using graphical conversion can provide a mechanism for required direct communications between the client and certain devices on the Internet, such as for DNS; additionally envisioned is that DNS data received or any data received by the Lead Machine 1250 from the Internet can be captured graphically and converted to video and passed across already described mechanisms of object substitution, and converted in the Landing Machine 1240 or other mechanism back to a useful form such as text and directed into the appropriate application such that the information be available to those who need it such as a DNS query from the client 1210 to the Landing Machine 1240.

It is further envisioned that the reconstitution of the data in the conversion from volatile to non-volatile data such as DNS occur in a controlled software application for specific purposes such as DNS. Further the software is controlled and outside the reachability of the user and contained within software that is controlled by a process which is secure. Furthermore it is envisioned that the functionality be configured in hardware using a hardware device such as an FPGA which is configured with a hardware coding language such as Verilog or VHDL.

Figure 11:
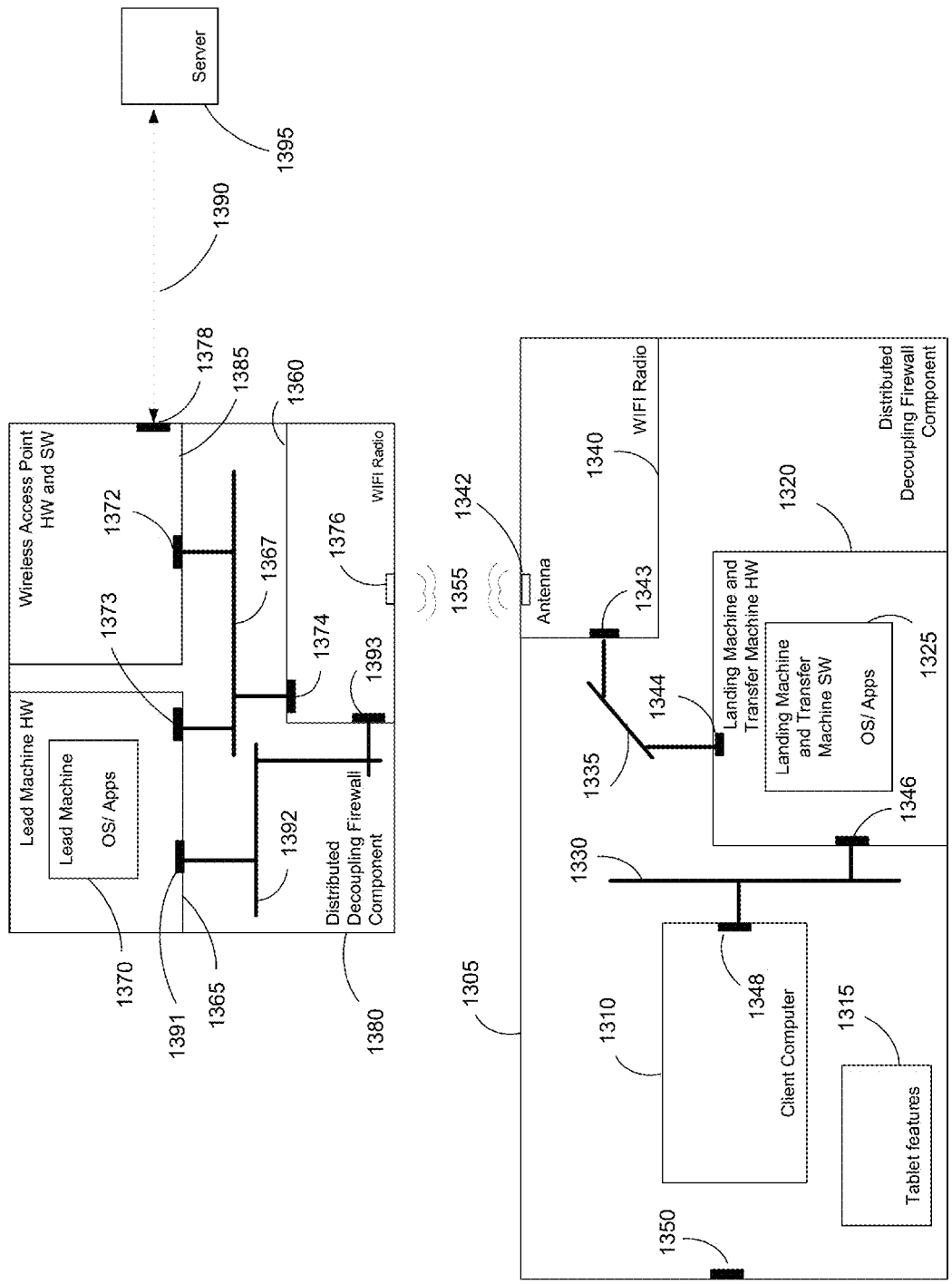
FIG. 11 is an illustration of a tablet, wireless access point integration in accordance with an embodiment of the invention.

It is further envisioned that the decoupling firewall 1290 be created in a single form factor such as shown in FIG. 10, or that the decoupling firewall methods and components 1305, 1380 be capable of being distributed into separate devices as shown in FIG. 11.

In an embodiment, FIG. 11, demonstrates an instantiation of the decoupling firewall distributed across and integrated into a wireless access point 1380 (WAP) and a user handheld tablet 1305, which could also be a cell phone. Further the instantiation shows a server or Internet server 1395 connected to a series of links and network devices 1390 which connect to the 'untrusted' side or Internet facing side of the distributed decoupling firewall 1380 component.

Further the Lead Machine 1365 and associated software 1370 are integrated with wireless access point hardware and associated software 1385 across an internal bus structure 1367 through their respective bus ports 1373, 1372. The Lead Machine bus port 1391 further connects the wireless radio across bus 1392 to the WIFI radio bus port 1393 and communicates video from the Lead Machine 1370 to the tablet 1305 across a radio frequency (RF) channel path 1355 between antenna ports 1376, 1342. Multiple buses 1367, 1392 ensure multiple paths through and allow engaging the protocol translation and content conversion methods. Furthermore the Lead Machine 1365 also receives keyboard and mouse data across the bus 1392 connecting the Lead Machine 1365 and the WIFI radio 1360 which originates from the Landing Machine 1320 integrated into the tablet 1305 across bus 1335 between ports 1344 on the Landing Machine and port 1343 on the tablet integrated WIFI radio 1340 with connected antenna 1342 for transmission via electromagnetic propagation 1355. In an alternative embodiment, the keyboard or mouse data may originate from the client 1310 and the tablet 1315 across bus 1330 through ports 1348 to port 1346 and propagated directly across the bus in the Landing Machine 1320 to 1335 or through a method using module 1325.

It is envisioned that the protocols which support transport from the Lead Machine 1365 across the bus 1367 through the WAP 1385 across a connection 1390 to the Server 1395 are in some instances UDP/IP, TCP/IP, ESP-AH. It is further envisioned that the Lead Machine 1365 receives and communicates in typical client communications with the Internet Server 1395 and that the results of that communication are converted into non-volatile data such as video output or composite objects and information, in a pacification of volatile to non-volatile data and further transported across a different protocol than the original protocol between the Internet Server 1395 and Lead Machine 1365, to the Landing Machine 1320 such as two unidirectional serial communications. The serial communications are envisioned to be video over serial from Landing Machine 1320 to Lead Machine 1365 across two buses 1392, 1335 and RF propagation 1355 with assistance of radio and antenna technology. It is also envisioned that the Landing Machine 1320 will send mouse and keyboard data over serial, such as USB to the Lead Machine across 1335, 1340, 1355, 1360, 1392. This embodiment is also envisioned to support other variations involving methods of bus directionality and feature bypass.

It is envisioned that software, driver and kernel modifications will support the communications. It is further envisioned that all tablet features such as finger control of the screen, software or hardware keyboards or similar will be connected via bus to the integrated Landing Machine for support of secure communications.

It is envisioned that the tablet will function automatically when a suitable Lead Machine 1365 is not found, that the tablet could take advantage of a service provided to substitute for a Lead Machine 1365, that a home Lead Machine 1365 could be reached across the Internet and that adjustments in connection and protocols would be made such as carrying mouse and keyboard over TCP/IP and video over TCP/IP or other protocols. A location service to locate secure method to obtain the service on the Internet or other private network when the proper hardware is not available is envisioned.

It is further envisioned that FIG. 11, could use alternative protocols such as TCP/IP between the wireless access point 1380, and that the Lead Machine 1365 and Landing Machine 1320 functionality could be moved to wherever is appropriate relying on internal bus for alternative protocols to sustain transport protocol conversion. It is envisioned that alternative architectures such as a single device integrated with a wireless access point will not require modifications by tablets, handheld devices, phones or slates; shown by example in FIG. 12.

Figure 12:
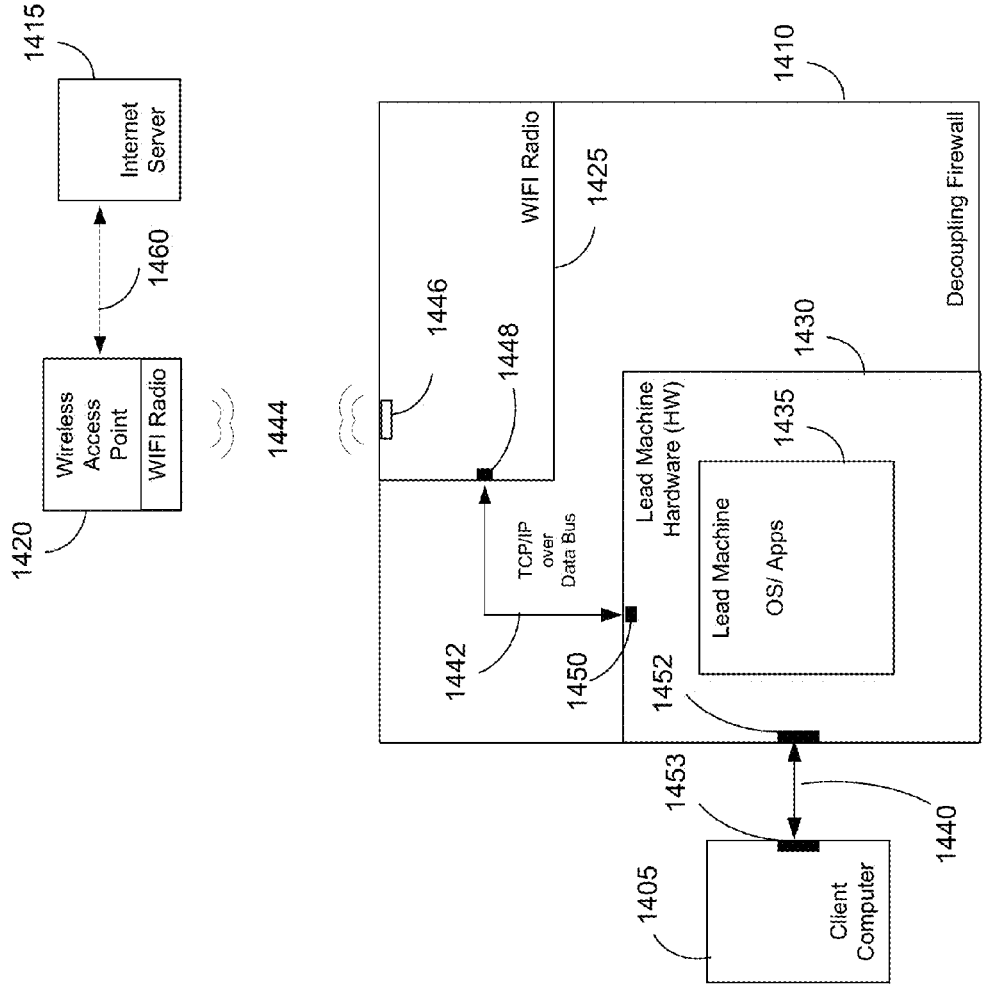
FIG. 12 is a diagrammatic view of an alternative method of implementation in accordance with an embodiment of the invention.

In the embodiment as shown in FIG. 12, a computer on the 'trusted' side of the decoupling firewall, also called the client computer 1405 may form a connection or communications channel across an interface 1453, 1452 and connection 1440 such as USB with the Lead Machine 1430 with other features such as Landing Machine functionality created within the Client Computer 1405. This instantiation also shows the protocol translation and content conversion on the Lead Machine 1430 and that the Lead Machine 1430 originates the protocol translation from TCP/IP on port 1450 to USB on port 1452. This embodiment is supported by additional protocol translation within the client 1405.

FIG. 12, in another embodiment may use a software conversion in 1420 for one side of the protocol translation while the other is translated in hardware in 1430.

In an embodiment, the protocol translation shown in FIG. 6, from Ethernet/IP/TCP 625 to USB 630 to Ethernet/IP/TCP 620 and information decoupling from volatile data to non-volatile data 680 can occur in a compressed method of a single device or in many devices and stages. Decoupling processes such as 680, 690 may occur in any single hardware device such as a special purpose or general purpose computer or distributed in stages across multiple devices with hierarchical methods deployed to create new and unique architectures. It is further envisioned that the Lead and Landing Machines may be able to be consolidated through hardware and software techniques into a single hardware computer system.

Figure 13:
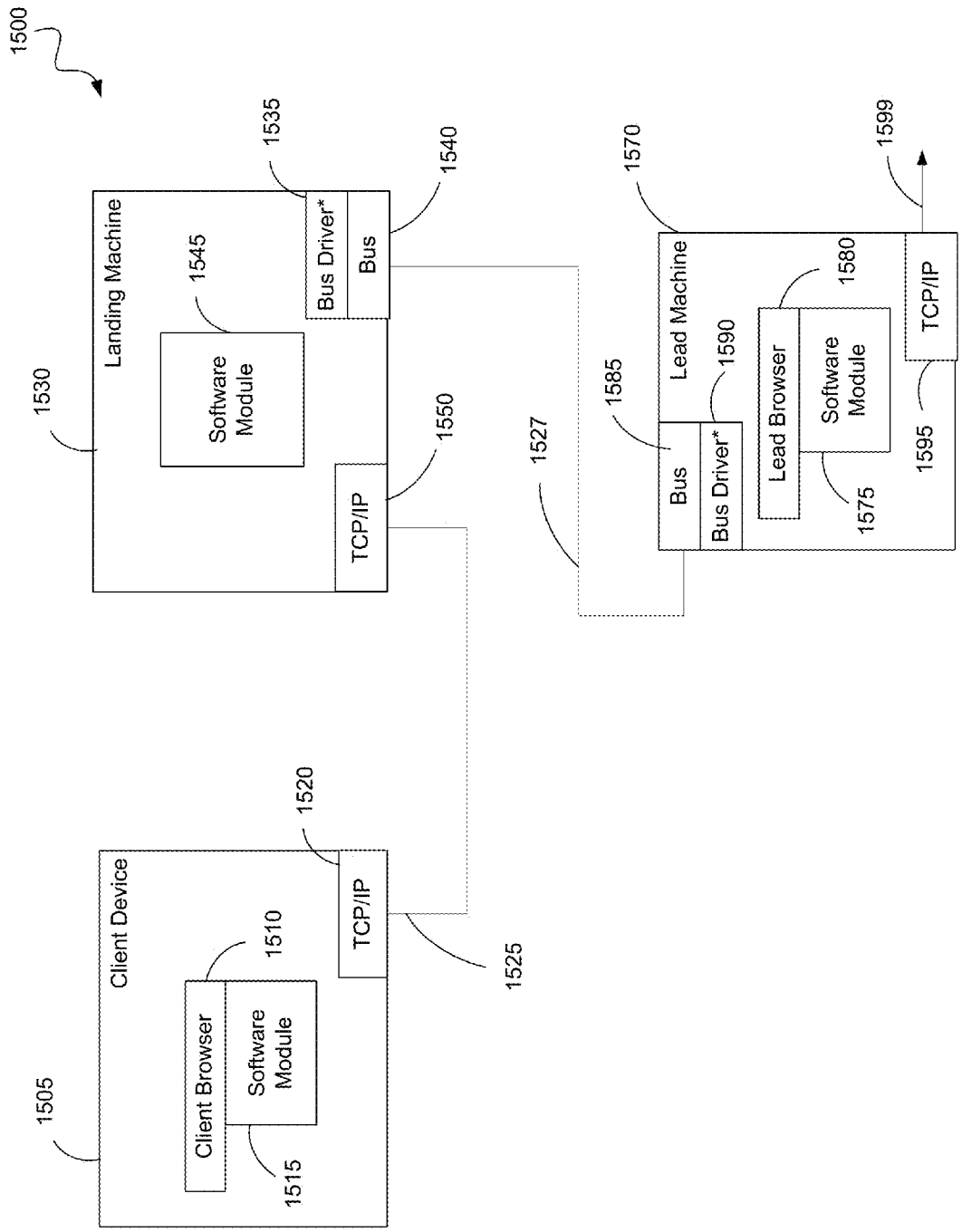
FIG. 13 is an illustration of the software and communications in accordance with an embodiment of the invention.

As shown in one embodiment FIG. 13, software components such as a browser 1510, java plugin 1515 and network connection driver 1520 are envisioned to support the communications of the client computer, phone or slate 1505 with the Landing Machine 1530 which may be a hardware module, component or distributed components. The Landing Machine 1530 is further envisioned to be supported by network and bus drivers 1550, 1535 as well as applications which may be general purpose to support control of mouse, keyboard and video and other purpose transport which may include support by low level kernel or driver software. Across connection 1525 the client 1505 computer is envisioned to send mouse location output and keystroke output to the Landing Machine 1530. Also the Landing Machine 1530 is envisioned as sending composite video and information or composite objects and information the 1525 connection which has been shown to be capable of being a single bus like USB in other diagrams or two separate connections such as HDMI and Serial. The connections may only support the one way transport of data over bus, with clocking or low level signaling being permitted but is not required, depending upon the implementation of the decoupling firewall.

Both communications paths 1525, 1527 in this embodiment will have mouse and keyboard output flowing from the trusted side which begins at the client computer 1505 to the untrusted side which is the 1599 connection. Both communications 1527, 1525 can have video flowing from the untrusted side 1599 toward the trusted side where the client 1505 is located, as video is considered in this case as non-volatile; the video may however pass through filters by processes shown in FIG. 18 and FIG. 19. Mouse and keyboard control functions in FIG. 13, also refer to other input methods such as finger taping on a phone screen, software keyboard input such as on a phone or mobile device using any OS, such as Android.

In one implementation, the java plugin 1515 is envisioned as reading the client keyboard and sending the data over TCP/IP, practically speaking that may be when the mouse is in the active window associated with the browser, or when a fingertip taps on an active browser which is using the invention or when active software is projected from the decoupling firewall 1530 and 1570 to the client device 1505 and is being controlled from the client device 1505. In this case the term active software relates to the forward most window on the operating system which is an image of the Lead Machine's local window so it does not contain any volatile code that would be able to perform a function on the computer if actually clicked by the mouse or tapped by a finger. The object substitution control mechanism, assists a mouse click or finger tap is carried forward over TCP/IP and alternative transport protocols, all the way to the active content on the Lead Machine, which in one embodiment in turn is passively converted into video or composite objects and information or a combination thereof, and sent back to the client computer 1505 and the associated actions thereof making the screen appear as if it contains active or interactive content. Importantly, active software here only relates to the window being in the foreground and being able to be clicked or moved by the mouse. Similarly the plugin or other software method 1515 is envisioned as reading the mouse or pointer location when over an image or reproduction of the active window and projecting the image correctly on the local computer monitor.

One instantiation of the decoupling firewall is supported by software module 1515 which supports a client browser 1510 on the client computer 1505. The software module 1515 is envisioned as javascript or a java plugin which captures communication for the associated mouse state such as window frame location and mouse click buttons in addition to keyboard state such as key depressed, length of time for key depression. It is envisioned that a supporting software module 1515 displays video within the Client Browser 1510 as received from the communications interface 1520 across a physical or logical connection 1525 from the communications interface 1550 of the Landing Machine 1530. The communication of the captured mouse and keyboard state data is envisioned to be directed by the software module 1515 with the assistance of kernel and driver through a communications interface 1520 to the Landing Machine 1530 across the logical or physical connection 1525. The software module is envisioned as single or multiple software components which support another application such as a java plugin, an application, or any related software modification to a driver, or the kernel.

Further, the Landing Machine 1530 contains a set of software shown as a software module 1545. The interface 1550 receives mouse and keyboard state data from the client computer 1505 and the software module 1545 processes, modifies and reconstitutes the data for communications over a bus 1540 supported by a driver for the bus 1535. The software module 1545 further receives video content or objects and information, envisioned in content conversion methods to be received through the bus 1540 from the Lead Machine 1570. The video is directed, after processing, to the Client Computer across the communications interface 1550. Further, the Lead Machine 1570 is envisioned as having a Browser 1580 with a software module 1575, which may be embodied as a VM. The software module 1575 contributes to the information decoupling by capturing the output of the Lead Browser 1580 and converting it to images or video or composite objects and information for transmission to the Landing Machine 1530 over the bus 1585 with support of the driver 1590. The bus 1585 receives both mouse and keyboard control commands from the Client Computer 1505 which is sent by the Landing Machine 1530 to the Lead Machine 1570. The bus 1585 sends the frame or video output of the software module 1575 to the Client Computer 1505 through the Landing Machine 1530. The Lead Machine Browser 1580 interacts with devices over the communications interface 1595 and further terminates Internet, external, outside or untrusted communications over connection 1599. Stated alternatively, 1595 is one IP endpoint of a communications which does not pass through the decoupling firewall, but over the Internet or network across interface 1595 to another IP endpoint. It is envisioned that the Lead Machine 1570 performs the mouse and keyboard functions with help of the software module 1575 upon the browser 1580 as communicated from the original source, the Client Computer 1505 through the Landing Machine 1530 across the change of protocol occurring on the bus 1527 to the Lead Machine 1570.

In one embodiment, it can be said in the envisioned decoupling firewall, that the source of the mouse and keyboard output is the Client Computer 1505 and the sync of the mouse and keyboard state is the Lead Machine 1570. Further, it can be said of the envisioned decoupling firewall that the source of the video is the Lead Machine 1570 and the sync of the video is the Client Computer 1505. Further it is envisioned in this specific example of the invention that the communications interfaces 1520, 1550 and 1595 are Ethernet which support TCP over IP and the TCP/IP protocol stack. Further it is envisioned in this specific example that the Bus interfaces 1540, 1585 are USB that the software modules 1515, 1575 are java plugins and the bus drivers 1535, 1590 have been modified or supported by modified software.

Figure 15:
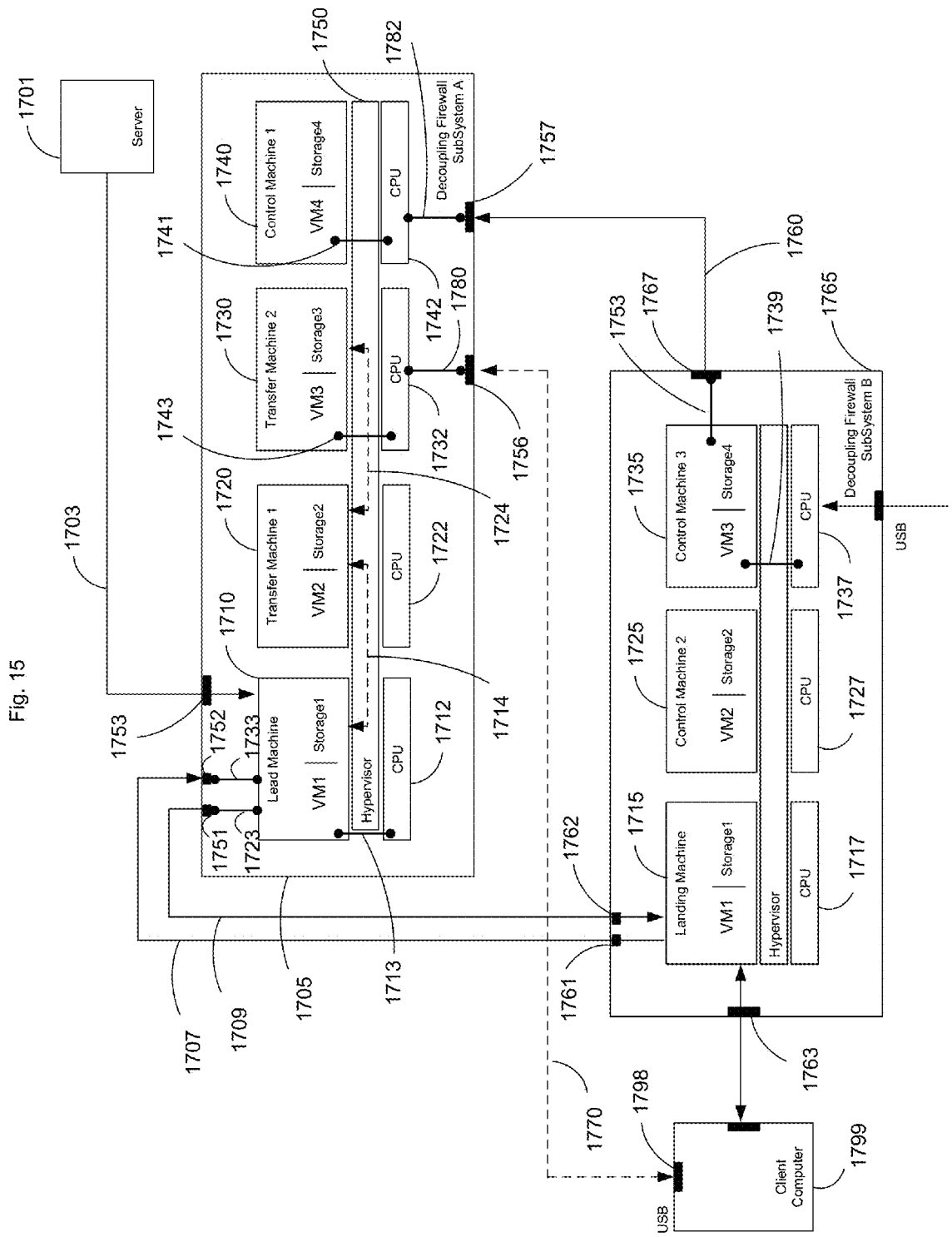
FIG. 15 is an illustration of a virtualized implementation of the invention and supporting methods in accordance with an embodiment of the invention.

In an embodiment, FIG. 15 using a VM for software 1545, 1575 can use modified libraries, on the Lead Machine 1570 and Landing Machine 1530, such as OPENGL which writes to a frame buffer object through a connection in the hypervisor by directing the information to an alternative driver which directs the information which is presented to the other VM. Thus allowing the decoupling firewall to be built in Hardware such as FPGA card implementation in the Client Computer or an appropriately designed USB stick can provide the ability but the solution is not limited to those approaches.

Figure 14:
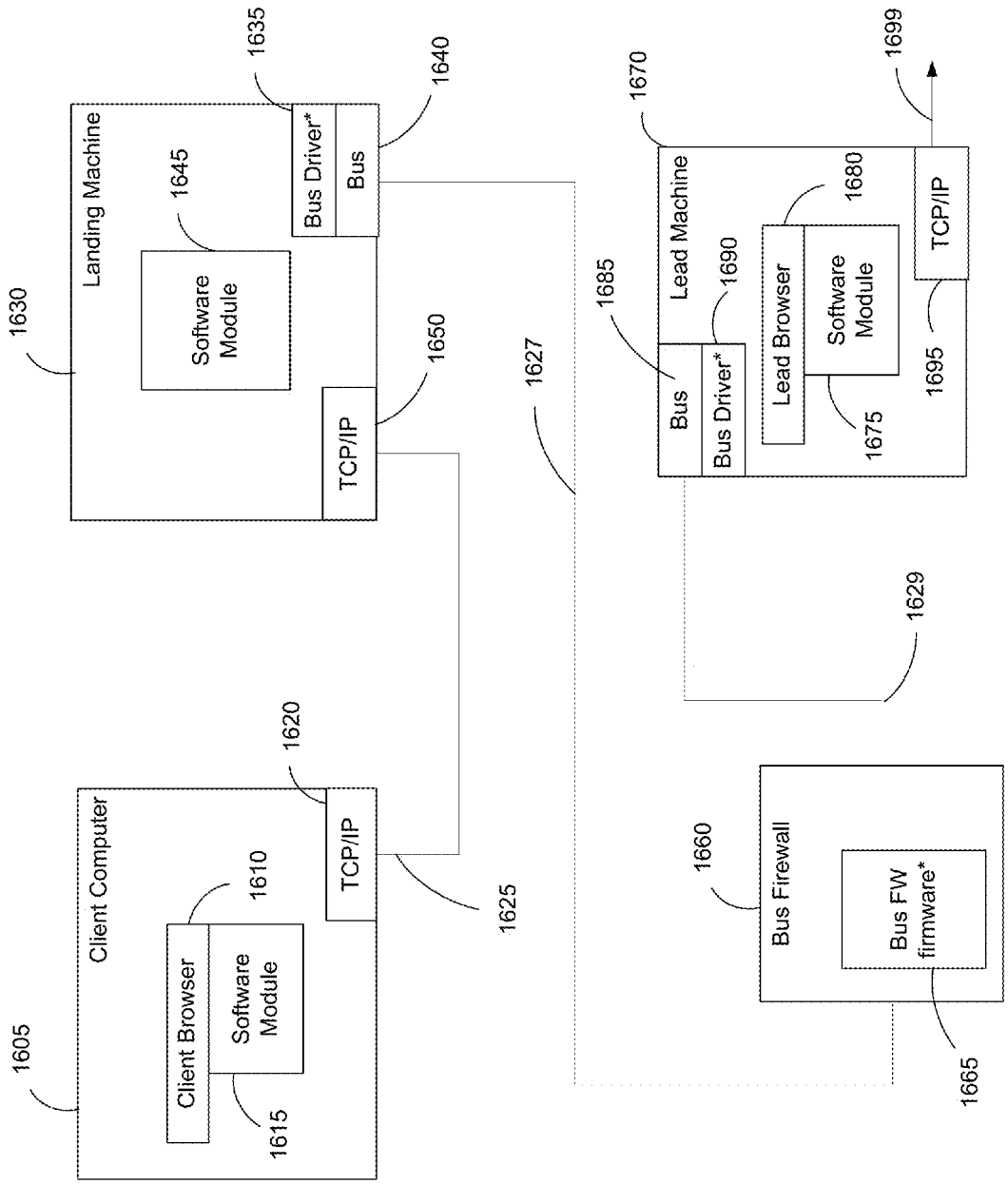
FIG. 14 is an illustration of the bus firewall integration with the firewall inventions software and paths in accordance with an embodiment of the invention.

In FIG. 14, it is shown further that the bus connection from the Lead Machine may further be connected to a bus firewall invention 1660 containing bus firewall firmware 1665. It is shown in FIG. 14 that the bus firewall invention is located between the Landing Machine and Lead Machines which communicate over a bus such as a USB or serial bus. It is not required that a bus firewall invention exist for the decoupling firewall 430, 550, 665, 710, 895, 1195, 1290, 1410 to exist and function as intended. The bus firewall invention is envisioned to enforce bus communications rules, such as keywords and signals and may be enhanced by cleverly modified bus drivers 1635, 1690 and appropriate kernel modifications.

In one embodiment shown in FIG. 15, the decoupling firewall is shown as being placed between the destination, a Server 1701 and the source, a client computer 1799. Communications between the Server 1701 and the decoupling firewall Subsystem A 1705 containing the Lead Machine component 1710 of the decoupling firewall occur over a logical connection 1703 over a network consisting of physical and logical links and devices. Further it is envisioned that the physical port 1753 of a major subsystem of the embodied invention 1705 which contains the Lead Machine 1710 is uniquely connected, in this implementation, to a virtual machine with isolated storage and software as described in FIG. 13 and FIG. 14, The Subsystem A 1705 is envisioned as being further subdivided into a hypervisor 1750 and multiple virtual machines (VMs) to include a Lead Machine 1710, Transfer Machines 1720, 1730 and a Control Machine 1740. The hypervisor is envisioned as having modified switching paths 1714, 1724, to include controlled switching between VMs which may be further controlled via external switching. Virtual Machines 1710 are further envisioned as pinning 1713 to a specific CPU 1712 to further include pinning of the VM 1710 to specific ports 1751, 1752 and allowing a single VM to control an entire port via software modification to the Hypervisor and driver software 1750.

Methods have been envisioned to permit automated replacement of a corrupt or modified machine using the control machine 1740 in the Subsystem A 1705.

Pinning 1743 of the Transfer Machine 1730 to a CPU 1732 and USB connection 1780 in addition to non-IP transfer using a protocol translation with a special path 1724 keeps a consistent invention path protocol variation characteristic of no single protocol between a protected device such as a Client Computer 1799 and the communication partner such as a Server 1701, even for sneakernet USB data transfers 1770. The dashed line 1770 represents a user moving a device such as a USB stick between the communications ports 1756, 1798 from the Transfer Machine 1730 which is pinned 1743 to a CPU 1732 and a port 1780. The transfer 1770 is envisioned as a permanent connection in some instantiations. The control machine 1740 ensures the required software is present and functional and facilitates remediation of the software on VMs 1710, 1720, 1730, 1740.

Similar pinning 1739 of the Control Machine 1735 on Subsystem B 1765 and pinning 1741 of the Control Machine 1740 on Subsystem A permits isolated communications between Control Machine 1735 and 1740 through the communications ports 1757, 1767 across a connection 1760, such as USB connectors and a USB cable. USB connections are envisioned as replacing serial and video cables in feasible implementations.

These and other techniques are envisioned including remediation of software variations tier security Transfer Machine techniques envisioned include traffic scanning for anti-virus and malware.

The solution is envisioned as implementable in a virtual single board system with hypervisor, kernel and driver modifications. It is further envisioned that the invention can be realized in the form of a hypervisor which has been properly designed with the decoupling of data from information, and the protection of the hypervisor or kernel, as priority in the design of the hypervisor and kernel network switching methods.

Figure 3:
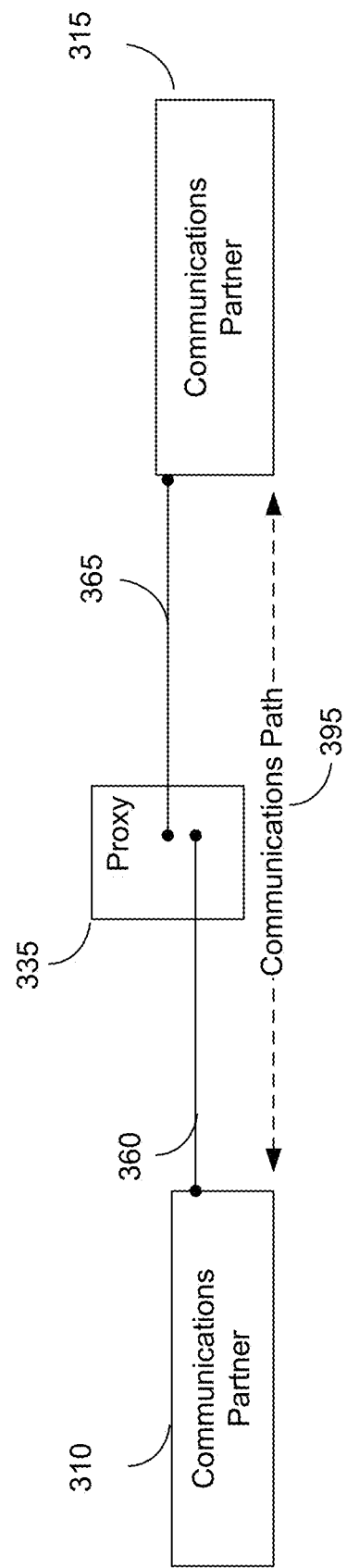
FIG. 3 is a diagrammatic view of a partial proxy interruption of higher layer protocols, with end to end communications path as is known in the art

In an embodiment, a description of protocol characteristics which support the communications illuminates the methods of embodiment which uses FIG. 1, showing the absence of the decoupling firewall and FIG. 5, showing the presence of the decoupling firewall in the communications path. In FIG. 2 and FIG. 3, the minor changes to the network by inclusion of network devices and existing network security do not significantly affect the features in the description of the protocol characteristics; the simplified form of the network is for conceptual clarification. A single path is assumed between communications partners, for simplification.

The use case in both instances involves a communications partner 110, 510 in this example, client computers on a private network to communications partners 115, 515 in this example remote server computers over a network path 160, 530. The client computers 110, 510 have an operating system and are running browser software such as Firefox, Chrome. The server computers 115, 515 have an operating system and are running server software such as Apache to serve web pages to clients which have browsers. The servers 115, 515 in some cases may be web servers.

In the case of the prior art client computer 110, a user opens a browser, types in a Uniform Resource Locator (URL) into the appropriate field and depresses the Enter key on the keyboard or software keypad. The client 110 performs DNS resolution to identify the IP address of the web server 115 and directs a request for the web page located on the server 115. The client 110 places IP packets containing the request on the network 160 and they are directed via the network to the web server 115. The state at this time of the client 110 is that the client browser is awaiting a response and the operating system on the client 110 has an open port listening for the response to the request from the web server 115. A packet was generated from the client 110 with a source IP address of the client 110 and a destination IP address of the server 115. As part of the communications process between 110, 115, a TCP three-way handshake must be completed to establish TCP reliable communications. Thus a series of IP packets which contain a TCP header with SYN, SYN-ACK and ACK flags are passed between the client 110 and the server 115. The packet was sent over IP using TCP between the two communications partners 110, 115 and the source port of the packet is an ephemeral port such as 1024 and the destination TCP port on the server is 80. The IP communications between the partners 110, 115 is end to end and will not be interrupted or altered. The TCP source and destination ports are end to end and will not be interrupted or altered between the source and destinations 110, 115. The request which originates at the client 110 and which will be received at the web server 115 is identical, bit for bit, letter for letter and instruction for instruction. Contained within the TCP/IP packet is an HTTP GET request. It is easily seen from sniffer software on the client and server that the identical data which was sent by the client 110 was received by the server 115, thus there is direct communication of data between the client 110 and the server 115. There exists TCP/IP end to end communications between 110 and 115 which is established and passing HTML data in accordance with, and over, the HTTP protocol.

The server 115 receives the HTTP GET from the client 110 over the network 160 because it has the correct IP address and an open TCP port 80 which is established by the web server software. The HTTP GET interacts with the server software to illicit a response from the server 115; as a result the server 115 prepares a response and replies to the client 110 with a web page sent to the client 110 and read by the clients browser which is listening on TCP port 1024. In turn the client's browser receives the data and acts upon that data to display a web page with content, layout and actions which are determined by the information communicated by the server 115. The server 115 can send active content which causes actions to be performed on the client computer 110, such as scripts with may have all manner of intent, normal or nefarious. Depending on other security measures and their updates, the server 115 could communicate instructions to perform a buffer overflow on the client or another malware. Key to this process is that the exact data communicated by the server 115 is received by the client 110 and that it may have direct effect on the client 110; this data can produce actions on the client 110, thus called active data.

The incorporation of the decoupling firewall 550 changes the protocol characteristics between the client 510 and the server 515. The user opens either client 580 on 510 or using coordinated software as part of the decoupling firewall 550, the user opens an image of a client browser 595 on 525 which projects software 580 on 510. The user moves the mouse across the screen to the field or representation of the field and clicks the mouse and then types a URL and depresses the Enter key on the computer. Multiple methods of implementation permit implementation variations, contained in all figures here within.

As a result of the decoupling firewall's supporting software on the client 550, the mouse movement, mouse click in the field and the keyboard enter key data is collected and passed over the network 530 to a subsystem of the invention 520 over the IP protocol via UDP. TCP communications are not required between the client computer 510 and component or module 520. Within component 520 a change of protocols 560 to 570 occurs with mouse and keyboard input being communicated to a component or module of the decoupling firewall 525 over the connection 540. There is no IP communications over connection 540 and thus no TCP or UDP ports which represent the communications between 520, 525 over connection 540. The component 525 receives the mouse and keyboard data with the assistance of protocol 570 over connection 540 through component 520 and the information is relayed to a browser running on an operating system on 525.

The browser on module 525 initiates a standard communication with the web server 525 running a web page server application such as Apache over the connection 535. Communications between module 525 and server 515 using TCP/IP 565 over the connection or network path 565 are similar to communications between 110, 115 using TCP/IP 195 over the connection or network path 160. As 110 received data directly from 115 and acts upon the data, some of which is active data, module 525 receives volatile data directly from server 515 and acts upon the data. At module 525 however, the volatile data is, in one embodiment, converted into video format and the underlying communications protocol 570 is also changed such that TCP/IP communications are only between module 515 and the server 525. The new protocol 570 sends video which contains no active content across a coordinated set of drivers on a unique protocol 570 across a unique link 540 such as HDMI out.

The nature of this communications is such that malware or a buffer overflow could not be communicated as the information is only video. The equivalent is that kissing your phone will not communicate your new highly contagious kissing disease to the person you are communicating with on a video phone call. At component 520 the video is converted for transport to the client 510 across the connection 530 over protocol 560; thus the active data can interact with applications and an operating system on 525, but not the client 510. The video sent from module 525 to the client 510 may include the entire browser window including the frame, close box, etc., or a portion thereof. Alternative methods of implementing the content conversion into composite objects and information or others described here within are also envisioned.

There is no direct IP communications between the client 510 and the server 515, also no direct TCP communications. There is no volatile data passed between the server 515 and the client 510, just information such as text, video and sound. No active script or software sent from the server 515 reaches the client 510, but the output may be performed on module 525 and viewed by a user on the client 510 thus communicating the intent or the information without actual data passing in an active or volatile format. This ensures that no command would be performed by software or the operating system on the client 510 and that any commands executed by clicking a link in the browser window 580 would be performed on module 525, the results of which would be displayed on the client 510 as shown in browser window 580.

The only data which can be communicated to the decoupling firewall 520 is mouse 585 and keyboard 595 data via special connection 560 and the only data received can be video, sound, passive content and information via connection 560; this does not in any way link the communications over a single protocol or single communications or limit the connection. The invention is envisioned as using several techniques for communications of this information, including enhancements to existing software, and new software.

Methods for passing certain types of information which require more direct communications through the invention such as DNS or for software in executable form is envisioned to be a natural extension of the concepts, some of which have been expressed.

Methods of remediation to reduce the exposure of 525 are discussed involving FIG. 9.

In an alternative embodiment using the same FIG. 5, there exists TCP/IP end to end communications between module 525 and the server 515 which is active and passing HTML data in accordance with, and over, the HTTP protocol. The client 510 has no direct communications with the server 515. The order of communications is illuminated by stepping through what occurs when a user operating on the client 510 tries to connect to a remote communications partner 515, perhaps on the Internet, using a browser with an appropriate plugin or other developed software program as part of the decoupling firewall.

Further in this alternative embodiment, the process begins when the user opens a browser and types in a URL it is envisioned that the decoupling firewall can indicate to the user that the invention is working on the screen of the user's computer which is not described here. An HTTP GET is sent from the client 510 to the URL typed into the browser on the client 510. When the HTTP GET request, contained in packets going from the client 510 to the server 515 which is intercepted by the decoupling firewall, the TCP three-way handshake and connection is terminated at the decoupling firewall on module 520, which is part of the decoupling firewall. This is to say that the SYN, SYN-ACK, ACK sequence occurs between the client 510 and module 520. The browser traffic from module 520 communicates directly with the invention subsystem 520 which is behaving in this embodiment as a server. In a use scenario, module 525 already has been created with an open browser window which corresponds to the window on the client 510. If virtualized, a VM cloning process would be used to generate new VM's with open browsers and appropriate additional software. A process links the browser on module 525 with the browser on the client 510 which is facilitated by module 520. The plugin from the browser on the client 510 passes the URL, keyboard and mouse movement to module 520 which in turn communicates this information unidirectionally to module 525 after a change of protocol also referred to as transport protocol translation here within. Module 525 acts on the URL information put into the browser and the enter key, or other active button such as refresh, on the client 510 to initiate communications with the server 515.

In the alternative embodiment of FIG. 5, the decoupling firewall module 520 provides the client 510 with a non-volatile data composed of passive content and information, sometimes referred to as information, sound and video, received by module 525 from the server 515 because module 520 is capturing frames or video output or using another content conversion of module 525. The intermediate content conversion by the decoupling firewall from HTML scripts on the server 515 to HTML scripts on module 525, which then is converted to video, objects and information on module 520 supplied inside a browser window to the client 510, unlinks the volatile nature of the original volatile data which contains volatile content from the passive data and information which the original data is intended to convey which is namely, in the example given, a visible webpage. This data translation eliminates execution on the client 510 of the HTML being communicated from the server 515 to module 525; the results of the scripts are viewable, but only an image of the browser is being seen by the client 510; the volatile content is still on the module 525 and remotely activated by the client 510. Neither the client 510 nor module 520 of the decoupling firewall 550 will execute any browser commands which module 520 is instructed to execute by virtue of the communications between module 525 and the server 515, however module 525 will be able to interact with the active content and execute the browser commands and other volatile code or active content.

As module 525 has a single end-to-end communications protocol in common with the server 515, data on the server 515 can still cause an event, for example a script to run, on the module 525 in this alternative embodiment. However, a virus which is hidden in a JPEG file which copies an unknown script from the server 515 to module 525 will not affect the client 510, nor will it affect module 520 which has only an abstracted method of passing information and objects or a video connection to module 525 and views the results via pixels, objects and passive content, not active commands with volatile code.

The application which is currently envisioned as a plugin on the client 510 will take the browser command and communicate that through module 520 into a URL which is communicated one way to module 525. It is in this method that module 525 is given instruction as to what web page to access. This URL content may or may not be found on the client 510 using digital forensic methods depending on the design of the plugin. For example in the registry key on a Windows VM using Internet Explorer as the browser on 525, the key "HKEY_CURRENT_USER\Software\Microsoft\Internet Explorer\TypedURLs" will contain the entry for the URL which is typed on the client 510. The reverse is also true. The one way flow of video from module 525 to module 520 and then to the client 510 and the one way flow of mouse and keyboard commands from the client 510 to module 520 and then to module 525 when the application or browser with a plugin window is active on the client 510 eliminates the passing of a virus from the client 510 to the server 515 as well.

The connection between module 520 and module 525 could be implemented as an HDMI video capture card from module 525 acting as a server for module 520 which acts as a client and receives the video. Module 520 passes mouse and keyboard commands which it receives from the client 510 to module 525 for command and control of the web browser on module 525. Module 520 acts as a server for the client 510 by providing it video of the browser on module 525 connected to the server 515 and also video feedback of the mouse and keyboard on module 525 which is being controlled by the mouse and keyboard of the client 510. The video of module 525 sent by 520 to the client 510, in this embodiment, is over TCP/IP.

Because the server 515 sends webpage data to module 525 and has the TCP three-way handshake with module 525, the data stream terminates on module 525 which can display an active web page. Instead of a video display however, the video output is generated and sent to module 520 either by video card or video stream or alternatively by other content conversion methods herein described. Module 520 can be thought of as a proxy between module 525 and the client 510 which cannot pass volatile code or commands outside its defined structure, and as such, when the invention is functioning nominally, there is no known way at present to pass malware from the server 515 to the client 510. The information however still flows from the server 515 to the client 510 after content conversion.

Figure 16:
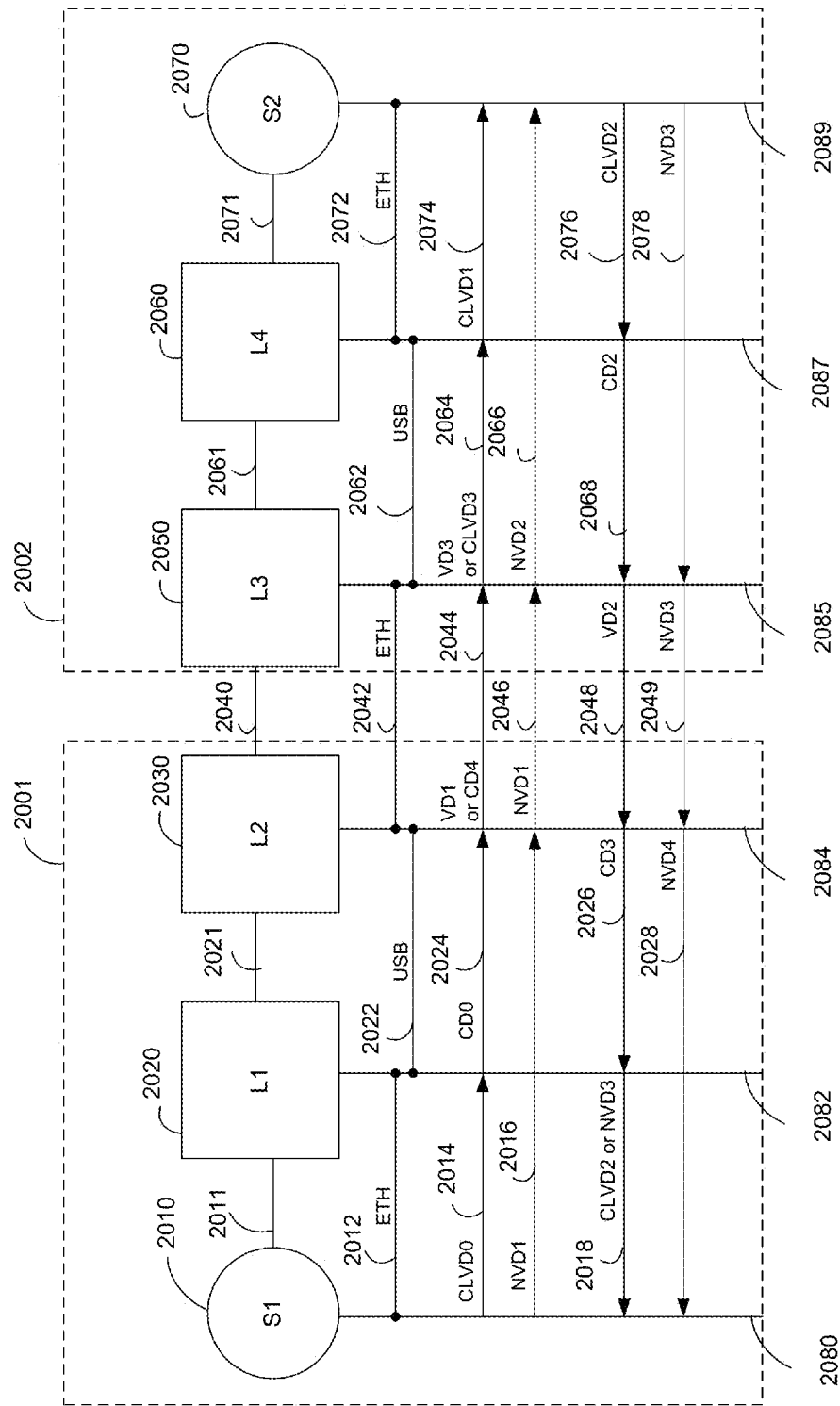
FIG. 16 is an illustration of connections, protocols and content conversions for two decoupling firewalls with different administrative domains in accordance with an embodiment of the invention.

In one embodiment, shown in FIG. 16, the decoupling firewall comprising modules 2020, 2030 in a single administrative domain 2001, is interfacing via an interface and connection 2040 with the decoupling firewall comprising modules 2050, 2060 in another separate administrative domain 2002. The two inventions may reasonably be administered by parties, not involved in the domains of the attached serves 2010, 2070. This pairing of firewalls 2020, 2030, 2050, 2060 is capable of bi-directional sharing of secure information or data transfer between two untrusted parties without risk of malware infection. This embodiment is envisioned to be modifiable in a variety of ways, for the exchange of map data or intelligence between government entities who may wish to eliminate risk of reproduction, interception or malware infection with the methods employed in the decoupling firewall to include multi-tier applications and other complex data exchanges.

The embodiment is a compound decoupling firewall system with Landing Machines L1 2020 and L4 2060 and Lead Machines L2 2030 and L3 2050; which provides both peer to peer and complex server-client communications patterns between server S1 2010 and server S2 2070. The invention is easily expandable to Lag Machines or others capable of providing additional points of modification to protocols, data, conversions from volatile data to information or the reverse including additional software modifications.

In one embodiment we see the protocol translation processes and content conversion processes 2080, 2082, 2084, 2085, 2087, 2089 represented in FIG. 16. The protocols used between the server 2010 and 2020 across the connection 2011 is Ethernet 2012. From 2020 to 2030 across the link 2021 is the USB protocol 2022. From 2030 to 2050, the two Lead Machines use the Ethernet protocol each in their respective administrative domain 2030 in 2001 and 2050 in 2002 across an insecure or secure connection 2040 such as the Internet or a crossover between the two organizations. Furthermore the Lead Machine L3 2050 is connected across the connection 2061 to the Landing Machine 2060 over USB 2062; which further connects to the server 2070 via 2071 over Ethernet, a typical network protocol.

In the connection, protocol, content conversion diagram FIG. 16, it should not be assumed that USB communications are TCP/IP or Ethernet over USB just as it is not assumed in any other configuration, while it would be within the ability of the decoupling firewall, in this embodiment Ethernet 2012, 2042, 2072 is unaltered, but USB is not. The pair of decoupling firewalls 2020, 2030 and 2050, 2060 could use any content set over a given protocol, 2012, 2022, 2042, 2062, 2072 across any series of connections, links or network devices 2011, 2021, 2040, 2061, 2071.

In one embodiment, Controlled Limited Volatile Data (CLVD) content is communicated across protocol 2012 over connection 2012 between 2010 and 2020. CLVD0 2014 is the output of Server S1 2010 in an outbound attempt to communicate with Server S2 2070. CLVD0 may include such things as an SQL Query request which was written by a COTS vendor such as Microsoft for its SharePoint Application. The SQL query may be seeking MAP data from S2 2070 through a data exchange connection 2040. At L1 2020 the request is received as CLVD and converted to Control Data (CD) content at process 2082 which is communicated between 2020 and 2030 across content path 2024. In some instances, at L2 2030, the CD0 is converted into Volatile Data (VD) content or it may stay in the format CD, here transformed to CD4 at process 2084. L3 2050 accepts or transforms the VD1 or protocol CD4 into CLVD3 at process 2085 with limited volatility using a software method over content path 2064. Once crossing to the other administrative domain 2002, L3 receives the VD1 data across the content path 2044 and converts any control data to CD1. CD1 is the protocol interface propagated from 2050 to 2060, which is converted by 2060 to CLVD1 at process 2087, which is not described here. The CLVD1 interface across 2074 is a limited permissible set of queries which are known to be safe permitted from the decoupling firewall 2060 which are called or influenced through the CD communications from 2050.

In one embodiment, if the two servers were performing video chat such as Skype, they could use the series of content paths 2016, 2046, 2066, 2078, 2049 and 2028 for communicating securely for the sound and video and if required a variation of the paths which would use Ethernet across 2012, 2022, 2062 and 2072 and USB on 2042, or with alternative variations. The communications would be supported by protocol sequences such as 2014, 2024, 2044, 2064, 2074 but not limited to that type of sequence. It is envisioned that many content sequences are viable and not limited to those presented such as 2016, 2044, 2064, 2074 and 2076, 2068, 2048, 2028.

It is envisioned that the features demonstrated in FIG. 16, do not require the hardware shown, but could use two or more machines for complete implementation of the features. Using additional machines such as 6 would also permit additional permutations of the features leading to additional levels of complexity and security. A single embodiment is also envisioned.

Figure 17:
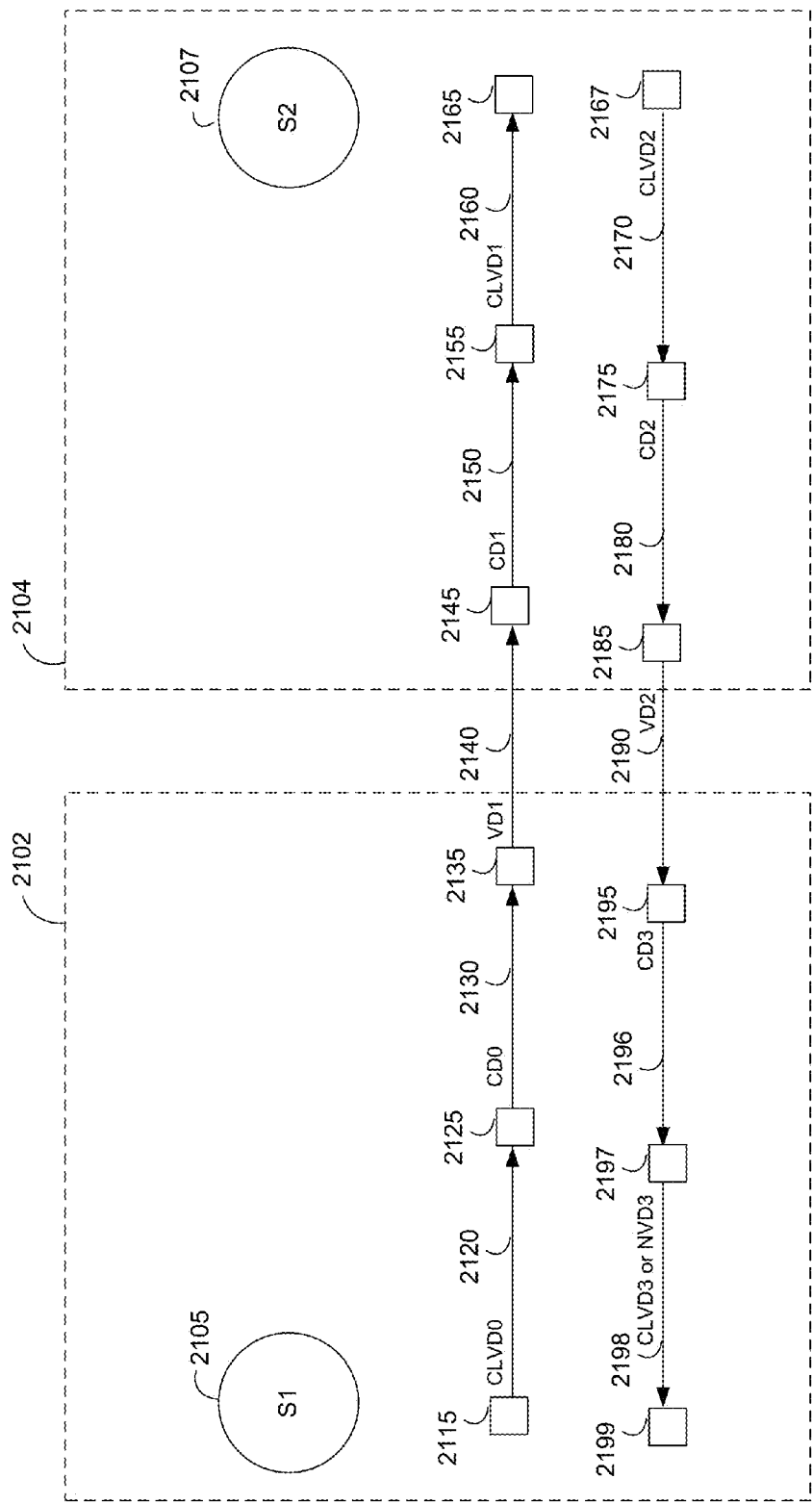
FIG. 17 is an illustration of two decoupling firewalls with decomposition of interfaces and software in accordance with an embodiment of the invention.

In one embodiment, shown in FIG. 17, two administrative domains 2102, 2004 implement a decoupling firewall software instance 2115, 2125, 2135, 2195, 2197 and 2199 for domain 2102 and for domain 2104 the decoupling firewall software instance is 2145, 2155, 2165, 2167, 2175, 2185. Features in the software support the protocol conversions across physical and logical layer protocols which support the higher layer content shown, such as Controlled Limited Volatile Data (CLVD) content on 2120, 2160, 2170, 2198 and volatile data (VD) content on 2140, 2190. Characteristics of the software application at 2125 involve transport protocol translation and content conversion in addition to other features shown in one embodiment depicted in FIG. 18.

Figure 18:
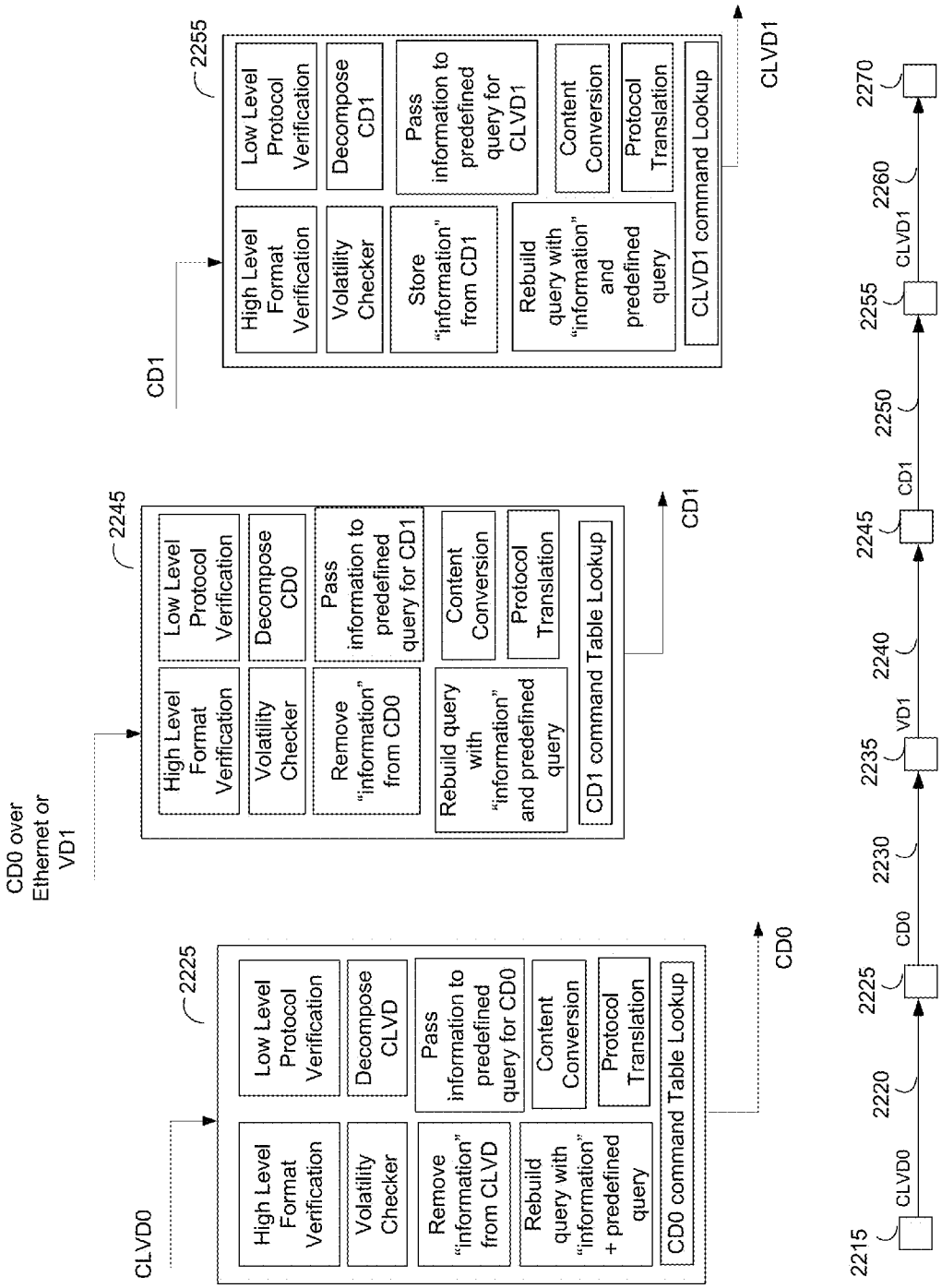
FIG. 18 is an illustration of decoupling firewall software methods and features for communicating between two servers in the initial direction for a SQL Query in accordance with an embodiment of the invention.

The software processes and applications 2215 in FIG. 18, are on the server in one administrative domain, protected by decoupling firewall software processes and applications on the Landing machine and software processes and applications 2225 in the same domain on the Landing machine. The CLDV0 content from 2215 to 2225 is received on 2225 by the series of functions and methods which include High Level Format Verification, Low Level Protocol Verification, Volatility Checking, Decomposition of the Interface for CLVD0, Removing information from the CLDV0 signal, Table Lookup for the corresponding CD0 commands, Query Rebuild, Query Passing and Protocol Translation and Content Conversion 2225. The CD0 content is converted in 2235 to VD1 over Ethernet. The VD1 content from 2235 to 2245 is received on 2245 by the series of functions and methods which include High Level Format Verification, Low Level Protocol Verification, Volatility Checking, Decomposition of the Interface for CD0, Removing information from the CD0 signal, Table Lookup for the corresponding CD1 commands, Query Rebuild, Query Passing and Protocol Translation and Content Conversion 2245. In 2255, the conversion methods are listed similar to 2225, 2245. Similar processes and methods are used for communications in the reverse direction from 2270 to 2215 to complete the communications.

Figure 19:
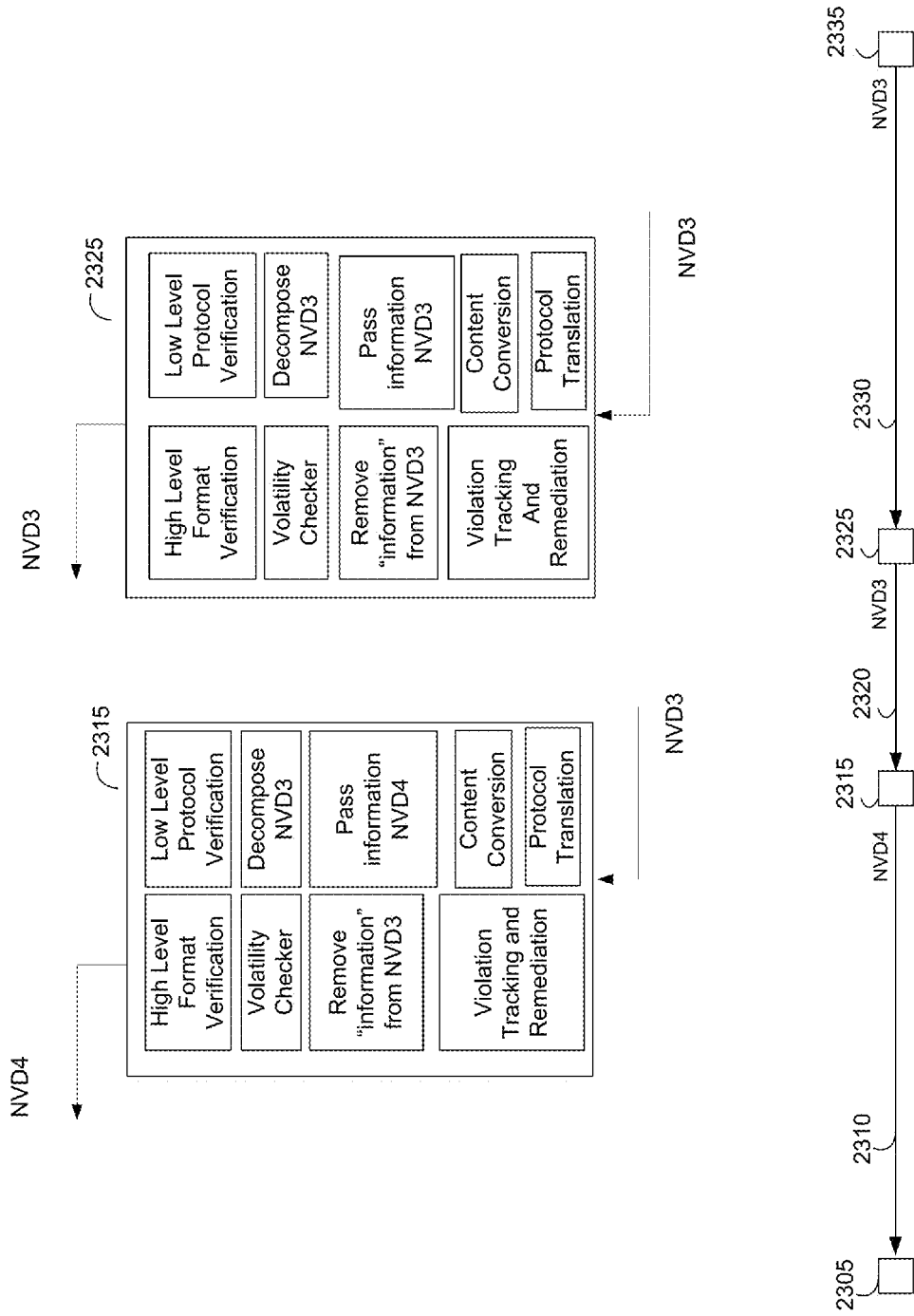
FIG. 19 is an illustration of decoupling firewall software methods and features for communicating between two servers in the response direction for return of Non-volatile Data in accordance with an embodiment of the invention.

In one embodiment, show in FIG. 17, the content 2198 could be non-volatile data. It is true that if map data were being requested, the bulk of the data would be non-volatile data and could be passed with minimal change in the reverse direction. Thus we show the features and methods in FIG. 19, for Non-Volatile Data (NVD) being sent from server 2335 in one domain across two decoupling firewalls on the two Lead Machines, but shown in FIG. 19, is the protocol translations and software conversion processes and applications. NVD content traverses the process 2325 between 2330, 2320. Software on the Lead Machine for the decoupling firewall protecting server 2335 has features which include Format Verification, Protocol Verification, Volatility Checking, Decomposition of Signal, Information Removal and Passing, Violation Tracking and Remediation and Protocol Translation and Content Conversion supported by methods imposed by implementation such as software, hardware, kernel, drivers and applications. NVD3 is converted to NVD3 with minimal latency, as is the conversion in 2315 to NVD4. This data such as map data could be integrated into an application, permitting with FIGS. 18, 19, the query of maps in relation to a target and the integrated display of the data without concern of malware or data theft in transit as mechanisms, methods and features described are all dynamic and work on dynamic in-motion data.

It is envisioned that non-volatile information is sharable via disparate entities such as government agencies securely, such as map data provided by a secure intelligence organization and another organization with more open and public facing policies, so both entities are secure from each other and any malware which may inhabit or try to traverse the two carefully connected systems 2102, 2104 shown in FIG. 17, protecting two servers 2105, 2107. Potentially Volatile data is converted to information and can be included in other sets, datasets or views, such as a satellite map data 2107 may be included on a screen 2105 for analysis by a police officer associated with a local suspect but provided by other government agency 2104 safely. This would preclude the sharing of actual volatile data and eliminate data exchange points such as Sharepoint which contain still documents as currently built, protecting the country from exposure seen in the past.

Thus, the exchange of data documents would never occur and thus not be available universally to one entity such as a Sharepoint administrator; however information in the form of non-volatile data would flow as conceived here within.

Figure 20:
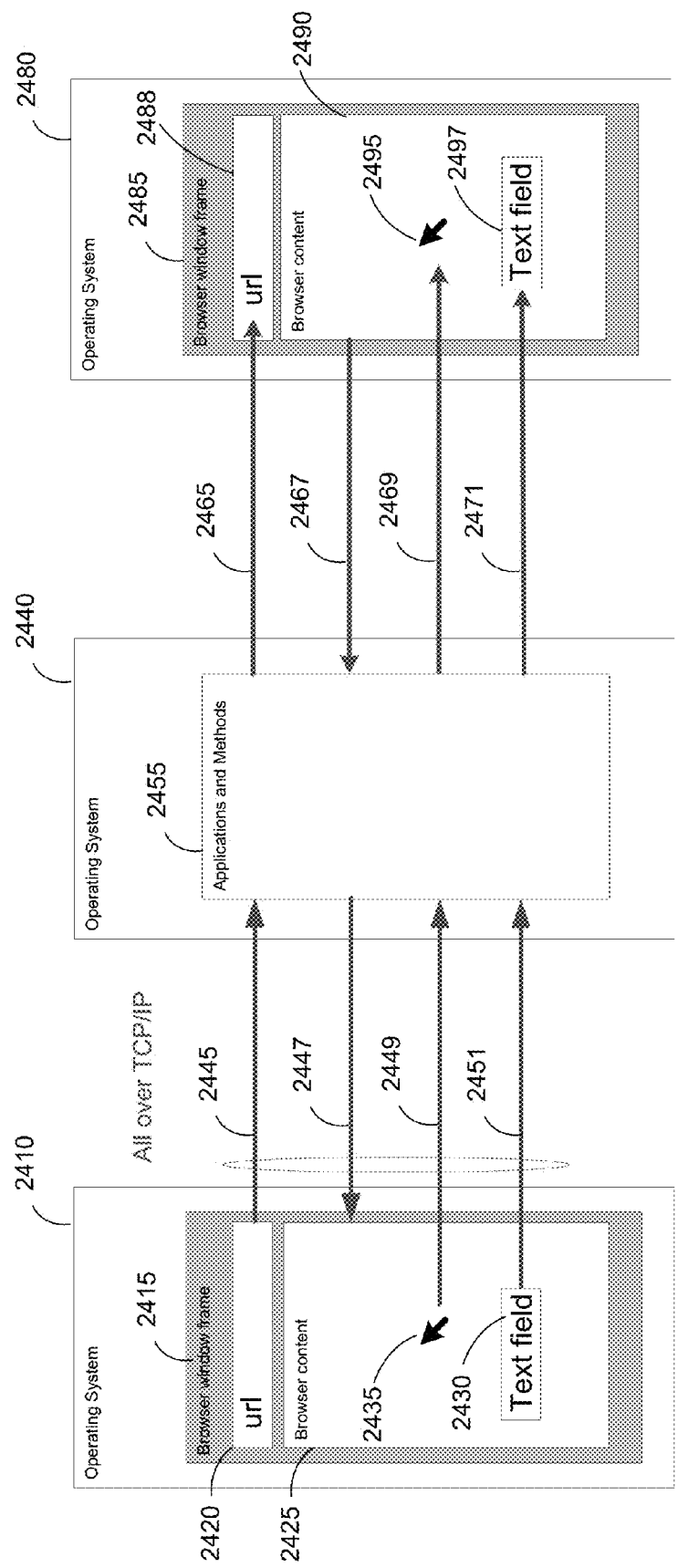
FIG. 20 is an illustration of a UI for a browser through the decoupling firewall in accordance with an embodiment of the invention.

As shown in FIG. 20, a high level user interface (UI) prototype for a browser application; the useful applications of the decoupling firewall are not limited in software application, direction or protocol. In one embodiment the UI on the user's or client computer consists of the graphical interface to the user from the operating system 2410 and a browser window frame 2415, field to type a URL 2420, location to view browser content 2425, a mouse 2435 and a text field 2430. The user types a URL in the field 2420 and can see the data they have typed directly from the UI. The browser content is a representation of the browser content 2490 which has been communicated by content over a protocol such as Video over HDMI 2467 after the entered URL in 2420 has been communicated to 2488 across keyboard over IP 2445, processed by applications and processes 2455 and transmitted by content over a protocol such as keyboard over IP 2465. The browser content 2490 returned by the machine responding to the URL is communicated over 2467 to the browser 2425 after passing by content over a content protocol combination such as Video over IP or other non-volatile data such as Composite Objects and Information over IP 2447. The mouse content 2435 is sent by content as mouse over IP 2449 and then after protocol translation 2455 as mouse over USB 2469 after the operations by software in 2455 ultimately to 2495 where it can perform such actions as mouse clicks; similarly the text is sent over IP 2451, translated by 2455 to text over USB to 2497 where the text may be entered directly upon the Lead Machine shown other embodiments as in FIG. 15, denoted 1710 or 1255 in FIG. 10. The amount of direct display versus how much is returned by video is variable and is envisioned to vary by application.

In an embodiment, FIG. 21, lists the pseudocode which is the basis for the decoupling firewall software which is on the Client Computer 2510, and the Landing Machine 2520, shown in an embodiment in FIG. 13 as 1530. FIG. 22, lists the pseudocode which is the basis for the decoupling firewall software which is on the Lead Machine, shown in an embodiment in FIG. 13 as 1570.

In an embodiment, the pseudocode in a browser on the Client 2510 may be implemented with a standard browser and JavaScript, in an alternative application or a combination.

In some embodiments the decoupling firewall's software may have mixed modes permitting volatile and non-volatile data to exist in the same solution to varying levels.

In some embodiments, the decoupling firewall may use predictive logic or other algorithms to determine the volatility of code and react to provide a system which is capable of handling threats by making them non-volatile through the methods demonstrated or others yet to be conceived.

In some embodiments virtualization within virtualization may be able to substitute for a portion of the non-volatilization of data and conversion to information.

Protocol translation which occurs twice or more in the decoupling firewall, typically is depicted on hardware, but can occur in software.

Software application mechanisms may include frame buffer capture or additional new techniques in hooking a virtualized instance of an application.

Figure 23:
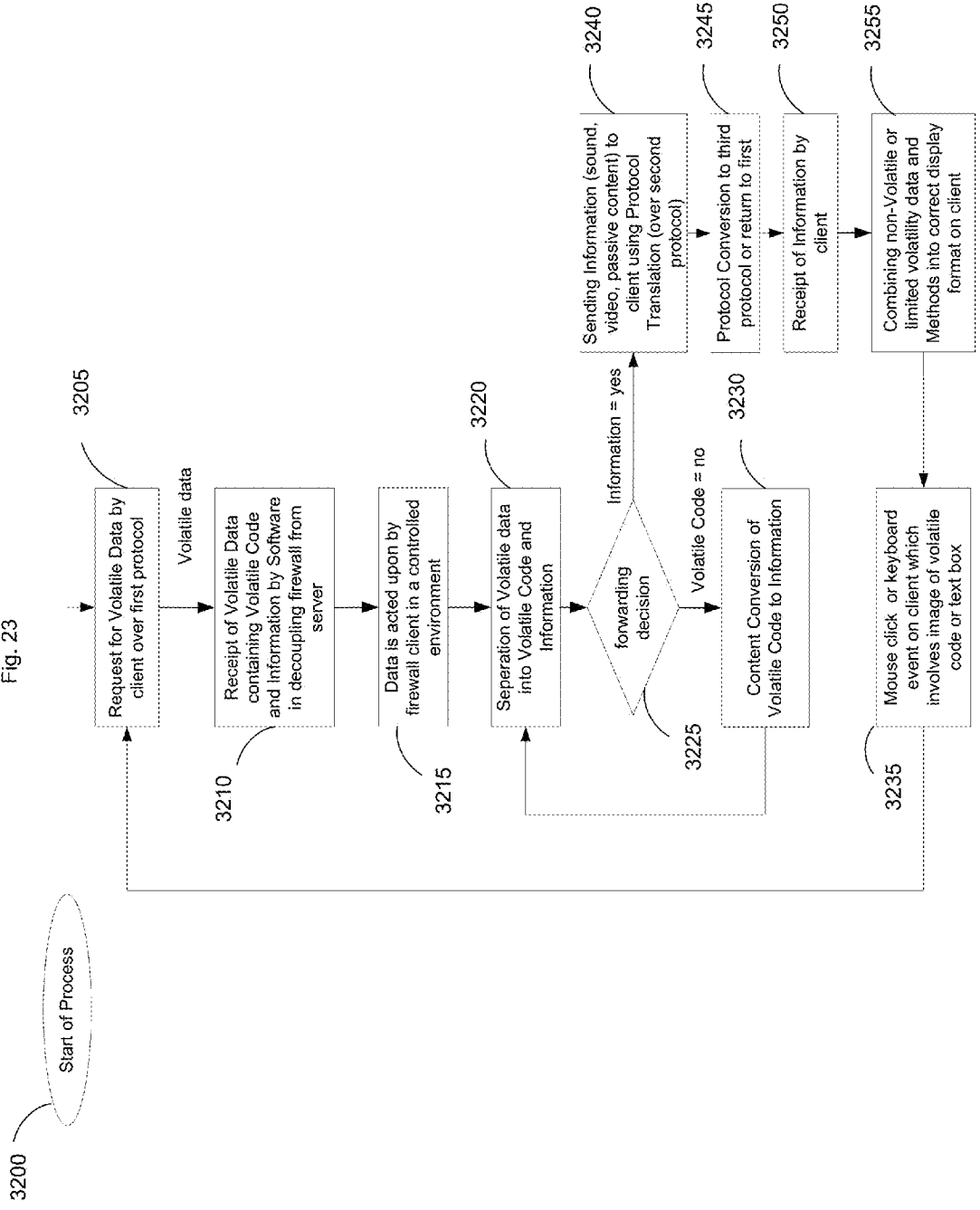
FIG. 23 is a flow diagram illustrating the processes for Source and Destination communications through the decoupling firewall in accordance with an embodiment of the invention.

Enumeration of a process involving both protocol translation and protocol conversion, shown in FIG. 23, begins with a Request for Volatile Data from the client 3205, as shown in embodiment FIG. 9 as Client Computer 1110. The Volatile Data consisting of Volatile Code and Information is received 3210 from the server 1115 by the decoupling firewall's 1195 Lead Machine component 1140. The data is acted and acts upon 3215 the Lead Machine 1160. Volatile Data is acted upon by the decoupling firewall such as volatile code causing a change in state and opening a pop-up window in the browser on the Lead Machine 1160. The Volatile Data is separated into the two components Volatile Code and Information 3220, and a forwarding decision is made 3220. If the content is Information, such as sound, video and passive content and thus it is forwarded to the client over a second protocol 3240. If the content is Volatile Code it is active content and it must pass through Content Conversion 3230. After Content Conversion, a portion of the process repeats 3220, 3225, 3230 for Volatile Code. After Information is sent to the Client 1110 and after Protocol Translation from first to second protocol 3240, a second protocol translation occurs from second to third or to the first protocol 3245 in the Landing Machine 1120. Information is received by the client 3250, combined 3255 and a mouse click or attempt to exercise volatile code restarts the process at the beginning 3205. In an embodiment it is the decoupling firewall's purpose is to convey Information which is passive in nature containing sound, video and other passive content but to also provide a manner to execute remote active content safely. The decoupling firewall functions to prevent any changes of state to the protected destination embodied in FIG. 9 as a client computer 1110 and is supported through the decoupling firewall's processing and determination of which content to convey to the client 1110, achievable in methods described here within using software. When the data received is of unknown volatility and thus referred to as Volatile Data, it consists of Volatile Code and Information. The information is to be conveyed, to the protected destination represented in other embodiments as a client 1210 or server 2010. Various conversion methods are applied to eliminate volatile data from being conveyed to the client computer 1110, including object substitution, graphical content imaging or other methods.

Control, non-volatile data and limited volatility data is forwarded to the appropriate location within the firewall as a sub process of Content Conversion 3230.

In FIG. 24, an embodiment is shown for the content conversion method for processing a webpage presented to the decoupling firewall from a source, in this case a webserver; the webpage is viewable by the user 3355 after the processes 3305, 3310, 3315, 3320, 3330, 3340, 3345, internal to the firewall or firewall related software have occurred. In 3305 the firewall decomposes and identifies the objects and information on 3300, or considering control data which indicates the user's preferences or video settings, that the user would be able to see and interact with if the page 3300 had been on their computer. In 3310, initial determination and classification of data occurs to determine volatility of data and disposition to various methods and processes 3315, 3330, 3335. Analysis and classification of non-volatile data such as information, text from a text field, sound or video which is acceptable to send occurs in 3330. In 3335 a method reviews layout and determines if it meets criteria to forward layout data without remediation or within acceptable parameters. In 3315 relationships between volatile and non-volatile items are clarified and determined. In 3320 methods are applied to build a layer of abstraction that can be safely transported and presented directly or indirectly to the user allowing multiple layers of abstraction. In 3325, a forwarding process communicates the output of 3315, 3320, 3330, 3335 to another subsystem or across a unique protocol or path within the firewall. The methods of relating 3320 and 3340 can be many and varied, but here 3340, the output of 3320 is associated 3340 through a reference over the link which only associates the two sides of the abstraction and the volatile nature of the transaction do not pass 3340; in this embodiment, an interface is built across the one way link in the reverse direction that is safe from the position of the inside subsystem of the firewall and unidirectional. In 3345, reassembly for presentation occurs for 3330, 3335 and 3340. In 3350, 3355 we see the description of the user interface and visual representation similar to 3300. It is not necessary that 3300 ever form or be presented on the firewall as methods of the firewall may function without any graphical processes as exemplified here within. When a user clicks on a graphic or an abstracted object, or abstraction method on their computer, a control message is sent through the abstracted layers in the reverse direction, such that the firewall is capable of acting on the control signal and take action 3365.

In an embodiment, FIG. 24 illustrates the content conversion method and also the content conversion which occurs in the decoupling firewall. Information decomposition is shown in 3305 via a non-graphical method. Decoupling is shown in processes 3310, 3315. The substitution of volatile code by objects is shown in processes in 3220, 3340. The combining of substituted objects and information is shown in process 3345 and the display of composite objects and information occurs in 3350, 3355.

In an alternative embodiment, FIG. 24 illustrates a second content conversion method and also a second content conversion which occurs in the decoupling firewall. Information decomposition is shown in 3305 via a graphical method involving capture of active content graphically on the screen for substitution. Information decoupling is shown in processes 3310, 3315. The substitution of volatile code by objects is shown in processes in 3220, 3340. The combining of substituted objects and information is shown in process 3345 and the display of composite objects and information occurs in 3350, 3355.

In an embodiment, FIG. 24 illustrates the transport protocol translation method shown in processes 3325, 3360. The method involves the use of an internal transport protocol in the decoupling firewall which is not used to externally access the firewall. Only the output of a Content Conversion are sent across the internal transport protocol which is non-volatile data, such as information, video, sound and composite objects and information.

In an embodiment, a TCP 3-way handshake occurs between a component, module or software running in the decoupling firewall. A TCP 3-way handshake does not occur with the originating source of volatile data, also called the source, and final destination of non-volatile data when the decoupling firewall is functioning in a nominal mode. The decoupling firewall may permit bypass of this functionality for certain use scenarios.

In an embodiment, when the decoupling firewall is functioning, data passes between the firewall and the source without impediment.

In an embodiment, text such as content which is not determined volatile by the invention may pass directly to higher stages of the firewall and even may be delivered to the client if sufficient determination is made regarding volatility. In a typical embodiment, content on the source often designated as the server 1215 such as in FIG. 10 is reproduced on the destination often designated as the client 1210 such as in FIG. 10, but passes through Content Conversions and Protocol Transformations, as required by a specific embodiment, eliminating the ability of the content to cause an action of any kind on the destination.

Methods of replacing active content with appropriate objects which cause an action within a stage of the firewall allow the user to interact in an indirect method with active processes or methods in the decoupling firewall. The architecture of the firewall is such that in a nominal functioning of the features, a level of abstraction is provided by the decoupling firewall so that the user is not directly interacting with any data or method that is invoked as a direct result of data transmitted from the source. This abstraction may have several levels built upon processes, methods, objects and software techniques which eliminate user exposure to volatile structures capable of committing a side channel attack by escaping the control put in place by the container. Such exposure from existing methods may occur for example from URL link in VM which is capable of interacting with the user in the form of a side channel attack.

The decoupling firewall, in an embodiment, is interacting with the source of the data such that a downloaded file called "infectme.jpg" which may contain other code or a virus cannot infect the destination of the data. The decoupling firewall interacts with the file as would a typical user, however the user is protected in that the "infectme.jpg" interacts with the firewall environment, and any volatile objects it creates which could escape the environment are evaluated as control methods or active content. At higher stages of the firewall even these identified active objects are further abstracted and constrained by levels of indirection within the firewall that only allow a user to interact with a secure object or a software interface which represents the object. Rules and learning ability within the firewall built upon heuristics and triggers may automatically induce a firewall reset of the software or interacting application, VM or subsystem which is communicating with the source to protect the user. The same principles and methods are used in the decoupling firewall to present other communications streams with variations, not limited to, but discussed here within.

It might be thought possible to simulate the invention by using a remote desktop application such as Microsoft's Remote Desktop Connection (RDC) or VNC to communicate with a VM and have the VM connect to the Internet. This however exposes the client computer to anything which can attack the computer exposed on the RDC or VNC TCP port being used an active and open TCP port between the client and VM. The data is not unlinked from the information content and if infected the VM can infect the client computer. Further, an attempt to call this invention similar to VNC to a VM and going to the Internet does not account for the two breaks in the TCP communications between the partners and a protocol which de-couples data from the information making the communications received by the user's client computer passive and not active. Using a VM to access the Internet on the user's machine also does not completely isolate the operating system from the VM infection because they share a common IP network or they are interconnected by a common IP network. Additionally, missing from this method are layers of abstraction for active content and susceptibility to side channel attacks.

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method for preventing direct communications between a server and a client, the method comprising: listening for application data on a first protocol associated with a first port associated with a first address of a first compute element; receiving the application data over the first protocol using the first address on the first port; reading the application data from the first protocol; assembling the application data from a multiplicity of one or more application protocol data units of the first protocol into an application message; exercising the application message to produce an observable action, wherein the observable action is the action requested by the server; capturing a multiplicity of one or more instantaneous states of the observable action, the multiplicity of the one or more instantaneous states not containing the application message; communicating the multiplicity of the one or more instantaneous states on a second protocol associated with a second port associated with a second address of the first compute element, not communicating from the first protocol to the second protocol, not communicating from the first address to the second address, not routing between the first port and the second port, not communicating the application data over the second port, not communicating the application message over the second port, the first address being from a first addressing scheme which is inconsistent with the second address, the second address being from a second addressing scheme which is inconsistent with the first address, the first address not associated with any other addresses from the second addressing scheme, the second address not associated with any other addresses from the first addressing scheme, the second protocol being a different protocol than the first protocol.

2. The method of claim 1, further comprising: listening for the multiplicity of the one or more instantaneous states on the second protocol associated with a third port associated with a third address of a second compute element, the third address being from the second addressing scheme which is consistent with the second address, the third address being from the second addressing scheme which is inconsistent with the first address, the third address not associated with the any other addresses from the first addressing scheme; receiving the multiplicity of the one or more instantaneous states on the second protocol on the third port using the third address.

3. The method of claim 2, wherein the second compute element is the client, further comprising: displaying the multiplicity of the one or more instantaneous states on the client.

4. The method of claim 2, further comprising: communicating, the multiplicity of the one or more instantaneous states received from the second protocol to a third protocol, the third protocol associated with a fourth port associated with a fourth address on the second compute element, is a different protocol than the second protocol associated with the third port on the second compute element, the third address being from the second addressing scheme which is inconsistent with the fourth address, the fourth address being from a third addressing scheme which is inconsistent with the third address, the third address not associated with any other addresses from the third addressing scheme, the fourth address not associated with the any other addresses from the second addressing scheme, the second protocol being a different protocol than the third protocol; listening for the multiplicity of the one or more instantaneous states from the third protocol on a third compute element; receiving the multiplicity of the one or more instantaneous states from the third protocol on the third compute element.

5. The method of claim 4, wherein the third compute element is the client, further comprising: displaying the multiplicity of the one or more instantaneous states on the client.

6. A system for preventing direct communications between a server and a client, the system comprising: a first compute element comprising a memory; a first application associated with a first protocol associated with a first port associated with a first address of the first compute element; a second application associated with a second protocol associated with a second port associated with a second address of the first compute element; the first application configured for listening for application data on the first protocol associated with the first port associated with the first address of the first compute element, receiving the application data over the first protocol using the first address on the first port, reading the application data from the first protocol, assembling the application data from a multiplicity of one or more application protocol data units of the first protocol into an application message by the first application, exercising the application message to produce an observable action, wherein the observable action is the action requested by the server; the first application not communicating with the second application, the first application not communicating from the first protocol to the second protocol, the first application not communicating from the first address to the second address, the first application not routing between the first port and the second port; the second application configured for capturing a multiplicity of one or more instantaneous states of the observable action, the multiplicity of the one or more instantaneous states not containing the application message; the second application configured for communicating the multiplicity of the one or more instantaneous states on the second protocol associated with the second port associated with the second address of the first compute element, the first address being from a first addressing scheme which is inconsistent with the second address, the second address being from a second addressing scheme which is inconsistent with the first address, the first address not associated with any other addresses from the second addressing scheme, the second address not associated with any other addresses from the first addressing scheme, the second protocol being a different protocol than the first protocol; the second application not routing between the first port and the second port, the second application not communicating the application data over the second port, the second application not communicating the application message over the second port.

7. The system of claim 6, further comprising: a third application associated with the second protocol associated with a third port associated with a third address of a second compute element; the third application configured for listening for the multiplicity of the one or more instantaneous states on the second protocol associated with the third port associated with the third address of the second compute element, receiving the multiplicity of the one or more instantaneous states on the second protocol on the third port using the third address by the third application, the third address being from the second addressing scheme which is consistent with the second address, the third address being from the second addressing scheme which is inconsistent with the first address, the third address not associated with the any other addresses from the first addressing scheme.

8. The system of claim 7, further comprising: the third application configured for displaying the multiplicity of the one or more instantaneous states on the client.

9. The system of claim 7 further comprising: the third application further configured for communicating the multiplicity of the one or more instantaneous states received from the second protocol to a third protocol, the third protocol associated with a fourth port associated with a fourth address on the second compute element, is a different protocol than the second protocol associated with the third port on the second compute element, the third address being from the second addressing scheme which is inconsistent with the fourth address, the fourth address being from a third addressing scheme which is inconsistent with the third address, the third address not associated with any other addresses from the third addressing scheme, the fourth address not associated with the any other addresses from the second addressing scheme, the second protocol being a different protocol than the third protocol; a fourth application configured for listening for the multiplicity of the one or more instantaneous states from the third protocol on a third compute element, receiving the multiplicity of the one or more instantaneous states from the third protocol on the third compute element.

10. The system of claim 9, wherein the third compute element is the client, further comprising: the fourth application further configured for displaying the multiplicity of the one or more instantaneous states on the client.

11. The system of claim 9, wherein the fourth port has a type which is physical or virtual, wherein the third compute element has a type which is physical or virtual.

12. The system of claim 7, wherein the third port has a type which is physical or virtual, wherein the second compute element has a type which is physical or virtual.

13. The system of claim 6, wherein the first port has a type which is physical or virtual, wherein the second port has a type which is physical or virtual, wherein the first compute element has a type which is physical or virtual.

14. One or more non-transitory computer-readable media having computer-executable instructions for performing a method of running a software program on a computing device, the computing device operating under an operating system, the method including issuing instructions from the software program comprising: listening for application data on a first protocol associated with a first port associated with a first address of a first compute element; receiving the application data over the first protocol using the first address on the first port; reading the application data from the first protocol; assembling the application data from a multiplicity of one or more application protocol data units of the first protocol into an application message; exercising the application message to produce an observable action, wherein the observable action is the action requested by the server; capturing a multiplicity of one or more instantaneous states of the observable action, the multiplicity of the one or more instantaneous states not containing the application message; communicating the multiplicity of the one or more instantaneous states on a second protocol associated with a second port associated with a second address of the first compute element, not communicating from the first protocol to the second protocol, not communicating from the first address to the second address, not routing between the first port and the second port, not communicating the application data over the second port, not communicating the application message over the second port, the first address being from a first addressing scheme which is inconsistent with the second address, the second address being from a second addressing scheme which is inconsistent with the first address, the first address not associated with any other addresses from the second addressing scheme, the second address not associated with any other addresses from the first addressing scheme, the second protocol being a different protocol than the first protocol.

15. The media of claim 14, further comprising: listening for the multiplicity of the one or more instantaneous states on the second protocol associated with a third port associated with a third address of a second compute element, the third address being from the second addressing scheme which is consistent with the second address, the third address being from the second addressing scheme which is inconsistent with the first address, the third address not associated with the any other addresses from the first addressing scheme; receiving the multiplicity of the one or more instantaneous states on the second protocol on the third port using the third address.

16. The media of claim 15, further comprising: communicating, the multiplicity of the one or more instantaneous states received from the second protocol to a third protocol, the third protocol associated with a fourth port associated with a fourth address on the second compute element, is a different protocol than the second protocol associated with the third port on the second compute element, the third address being from the second addressing scheme which is inconsistent with the fourth address, the fourth address being from a third addressing scheme which is inconsistent with the third address, the third address not associated with any other addresses from the third addressing scheme, the fourth address not associated with the any other addresses from the second addressing scheme, the second protocol being a different protocol than the third protocol; listening for the multiplicity of the one or more instantaneous states from the third protocol on a third compute element; receiving the multiplicity of the one or more instantaneous states from the third protocol on the third compute element.

17. The media of claim 16, further comprising: displaying the multiplicity of the one or more instantaneous states on the client.

18. A method for preventing direct communications between a server and a client, the method comprising: listening for application data on a first protocol associated with a first port associated with a first address of a first compute element; receiving the application data over the first protocol using the first address on the first port; reading the application data from the first protocol; assembling the application data from a multiplicity of one or more application protocol data units of the first protocol into an application message; exercising the application message, to produce an observable action, wherein the observable action is the action requested by the server; capturing a multiplicity of one or more instantaneous states of the observable action, the multiplicity of the one or more instantaneous states not containing the application message; communicating the multiplicity of the one or more instantaneous states on a second protocol associated with a second port associated with a second address of the first compute element, not communicating from the first protocol to the second protocol, not communicating from the first address to the second address, not routing between the first port and the second port, not communicating the application data over the second port, not communicating the application message over the second port, the first address being from a first addressing scheme which is inconsistent with the second address, the second address being from a second addressing scheme which is inconsistent with the first address, the first address not associated with any other addresses from the second addressing scheme, the second address not associated with any other addresses from the first addressing scheme, the second protocol being a different protocol than the first protocol; listening for the multiplicity of the one or more instantaneous states on the second protocol associated with a third port associated with a third address of a second compute element, the third address being from the second addressing scheme which is consistent with the second address, the third address being from the second addressing scheme which is inconsistent with the first address, the third address not associated with the any other addresses from the first addressing scheme; receiving the multiplicity of the one or more instantaneous states on the second protocol on the third port using the third address; communicating, the multiplicity of the one or more instantaneous states received from the second protocol to a third protocol, the third protocol associated with a fourth port associated with a fourth address on the second compute element, is a different protocol than the second protocol associated with the third port on the second compute element, the third address being from the second addressing scheme which is inconsistent with the fourth address, the fourth address being from a third addressing scheme which is inconsistent with the third address, the third address not associated with any other addresses from the third addressing scheme, the fourth address not associated with the any other addresses from the second addressing scheme; receiving the multiplicity of the one or more instantaneous states from the third protocol on the client; displaying the multiplicity of the one or more instantaneous states on the client.

19. A system for preventing direct communications between a server and a client, the system comprising: a first compute element comprising a memory; a first application associated with a first protocol associated with a first port associated with a first address of the first compute element, wherein the first port has a type which is physical or virtual, wherein the first compute element has a type which is physical or virtual; a second application associated with a second protocol associated with a second port associated with a second address of the first compute element, wherein the second port has a type which is physical or virtual; the first application configured for listening for application data on the first protocol associated with the first port associated with the first address of the first compute element, receiving the application data over the first protocol using the first address on the first port, reading the application data from the first protocol, assembling the application data from a multiplicity of one or more application protocol data units of the first protocol into an application message by the first application, exercising the application message to produce an observable action, wherein the observable action is the action requested by the server; the first application not communicating with the second application, the first application not communicating from the first protocol to the second protocol, the first application not communicating from the first address to the second address, the first application not routing between the first port and the second port; the second application configured for capturing a multiplicity of one or more instantaneous states of the observable action, the multiplicity of the one or more instantaneous states not containing the application message; the second application configured for communicating the multiplicity of the one or more instantaneous states on the second protocol associated with the second port associated with the second address of the first compute element, the first address being from a first addressing scheme which is inconsistent with the second address, the second address being from a second addressing scheme which is inconsistent with the first address, the first address not associated with any other addresses from the second addressing scheme, the second address not associated with any other addresses from the first addressing scheme, the second protocol being a different protocol than the first protocol; the second application not routing between the first port and the second port, the second application not communicating the application data over the second port, the second application not communicating the application message over the second port; a third application associated with the second protocol associated with a third port associated with a third address of a second compute element, wherein the third port has a type which is physical or virtual, wherein the second compute element has a type which is physical or virtual; the third application configured for listening for the multiplicity of the one or more instantaneous states on the second protocol associated with the third port associated with the third address of the second compute element, receiving the multiplicity of the one or more instantaneous states on the second protocol on the third port using the third address by the third application, the third address being from the second addressing scheme which is consistent with the second address, the third address being from the second addressing scheme which is inconsistent with the first address, the third address not associated with the any other addresses from the first addressing scheme; the third application configured for communicating the multiplicity of the one or more instantaneous states received from the second protocol to a third protocol, the third protocol associated with a fourth port associated with a fourth address on the second compute element, is a different protocol than the second protocol associated with the third port on the second compute element, the third address being from the second addressing scheme which is inconsistent with the fourth address, the fourth address being from a third addressing scheme which is inconsistent with the third address, the third address not associated with any other addresses from the third addressing scheme, the fourth address not associated with the any other addresses from the second addressing scheme, the second protocol being a different protocol than the third protocol, wherein the fourth port has a type which is physical or virtual; a fourth application configured for listening for the multiplicity of the one or more instantaneous states from the third protocol on the client, receiving the multiplicity of the one or more instantaneous states from the third protocol on the client, and displaying the multiplicity of the one or more instantaneous states on the client.

* * * * *